July 13, 1954 T. H. FLOWERS 2,683,772
APPARATUS FOR PROVIDING DESIRED INFORMATION
FROM STORED INFORMATION BY CORRELATING THE
STORED INFORMATION WITH RECEIVED STIMULI
Filed Nov. 8, 1948 26 Sheets-Sheet 1

Inventor
Thomas Harold Flowers
By Hall & Houghton
attorneys

July 13, 1954

T. H. FLOWERS 2,683,772

APPARATUS FOR PROVIDING DESIRED INFORMATION
FROM STORED INFORMATION BY CORRELATING THE
STORED INFORMATION WITH RECEIVED STIMULI

Filed Nov. 8, 1948

Inventor
Thomas Harold Flowers

July 13, 1954     T. H. FLOWERS     2,683,772
APPARATUS FOR PROVIDING DESIRED INFORMATION
FROM STORED INFORMATION BY CORRELATING THE
STORED INFORMATION WITH RECEIVED STIMULI
Filed Nov. 8, 1948     26 Sheets-Sheet 3

FIG. 4.

Inventor
Thomas Harold Flowers
By Hall & Houghton
Attorneys

July 13, 1954

T. H. FLOWERS 2,683,772

APPARATUS FOR PROVIDING DESIRED INFORMATION
FROM STORED INFORMATION BY CORRELATING THE
STORED INFORMATION WITH RECEIVED STIMULI

Filed Nov. 8, 1948

Inventor
Thomas Harold Flowers

July 13, 1954 T. H. FLOWERS 2,683,772
APPARATUS FOR PROVIDING DESIRED INFORMATION
FROM STORED INFORMATION BY CORRELATING THE
STORED INFORMATION WITH RECEIVED STIMULI
Filed Nov. 8, 1948 26 Sheets-Sheet 24

FIG. 25.

Inventor
Thomas Harold Flowers

Patented July 13, 1954

2,683,772

UNITED STATES PATENT OFFICE 2,683,772

APPARATUS FOR PROVIDING DESIRED INFORMATION FROM STORED INFORMATION BY CORRELATING THE STORED INFORMATION WITH RECEIVED STIMULI

Thomas Harold Flowers, London, England

Application November 8, 1948, Serial No. 58,864

Claims priority, application Great Britain November 10, 1947

12 Claims. (Cl. 179—18)

This invention relates to apparatus of the kind which is arranged to reproduce information from stored information by correlating the stored information with received stimuli.

An example of such apparatus is to be found in calculating or computing apparatus in which a stimulus in the form of the argument of a mathematical function is applied to the apparatus for the purpose of automatically calculating the value of the function which corresponds to the particular argument.

A further example of such apparatus is to be found in automatic or semi-automatic telephone systems in the form of register-translators to which a stimulus consisting in a code, by which an exchange or desired service is identified, is applied and which, on receipt of the stimulus, correlates items of information already stored therein with the code in such manner as to emit, for example, the necessary switch settings designated by the code, the charge for a connection or service and the number of numerical digits which should follow the code.

Since the subject matter is somewhat complicated, to facilitate its understanding the present specification is indexed by "sub-heads" which are here listed to constitute an index to the specification, viz:

I. Introductory matter

General objects
Known systems and further objects
Short statement of invention
Drawings

II. Detailed rescription of register input portions

First selector (Fig. 7)
Subscriber calling operation
Memory device (Figs. 1, 2, 3)
Definitions and conventions
Engaging and forced release timing means (Figs. 7-8)
Dial tone feeder, input digit pulse counter and input digit pulse train counter (Fig. 9)
Input digit binary register (Fig. 10)

III. Of storage of input digits

Serial storing of input digits
Stores operation (Fig. 11)
Stores selector (Fig. 12)
Stores outputs (Figs. 11-17, right)

IV. Of obtaining required translation

Stores and memory outputs comparer (Fig. 18)
Translation digit number designator and comparer (Fig. 22)
Translation digit forwarder (Fig. 23)
Digit sender (Fig. 27)
Trunk call registering and sending
Service call registering and sending

V. Of transmitter portion

Transmitting digits
Transmit-digit binary storage (Fig. 19)
Storing translation digit
Storing non-translated digit
Transmitting relay operator (Fig. 26)
Transmitted pulse counter
Transmitted pulse counter (Fig. 20) and computer (Fig. 21)
Intertrain spacing
Timing acceptance of digits
Transfer from register stores
Timing of digit seeking

VI. Disconnecting

Disconnecting after local calls
After trunk calls
After service calls

VII. Special purpose provisions

Transmission suspending means (Fig. 27)
Forced release (Fig. 8)
First code digit "one" reset

GENERAL OBJECTS

It is an object of the invention to provide a register-translator for an automatic or semi-automatic telephone system which is capable of holding a comparatively large quantity of stored information and at the same time be comparatively small in bulk and reasonably economical to construct.

A further object of the invention is to provide register-translator and like apparatus which has a comparatively compact and inexpensive memory of large capacity and which is suitable for permanent connection to a comparatively large number of register-transmitters.

KNOWN SYSTEMS AND FURTHER OBJECTS

Known register-translator apparatus for automatic or semi-automatic telephone systems may be divided into three parts. The first part, which is called the register, comprises apparatus which is adapted to receive and store code digits transmitted to it, and to receive and store in a similar manner numerical digits which do not form part of the code but which have to be stored and retransmitted after the operations stimulated by the code are completed. The second part, which may be called the memory, comprises apparatus by which blocks of information corresponding to the code are recorded in machine form together with apparatus which is adapted to convert the information from its recorded form to a form suitable for use by the third part. This third part, which is called the transmitter, comprises apparatus adapted to extract from the memory the block of information corresponding to a code stored in the register, to make the information available in the desired form and to enable the complete equipment to perform such additional functions as may be desired.

In known methods, when the quantity of information to be held by the memory is large, the cost and bulk of this part may become unduly great. It has been sought to meet this difficulty by imposing restrictions on the amount of information which a memory should accommodate with the result that some connections may be forced to take a less economical route than would be possible with a larger memory so that much of the economy effected by reducing the size of the memory is offset.

It has also been frequent practice to provide, in telephone installations which require a plurality of registers, a number of registers each with a transmitter, the combination being known as a register-transmitter. In this arrangement a smaller number of memories is provided, a register-transmitter being connected by switches to a memory and being permitted the exclusive use of a memory only as long as its services are required by the register. In such arrangements, difficulty is likely to arise in connecting a memory to a register-transmitter as when, for example, all codes do not comprise the same number of digits.

It is a further object of the invention to provide an apparatus in which the connection of a register-transmitter to a memory is facilitated.

SHORT STATEMENT OF INVENTION

According to the invention apparatus for providing desired information comprises information recording means which is arranged to produce continuously a series of electric signals each of which represents an item of the recorded information whereby the various items of said information are successively reproduced as electric signals.

Further according to the invention apparatus for providing desired information comprises information recording means which is arranged to produce continuously a series of electric signals each of which represents an item of the recorded information so that the various items are successively reproduced as electric signals and register means permanently connected to the recording means and arranged to receive the said electric signals.

In a further feature of the invention a plurality of register means are permanently connected to the recording means over at least one common lead.

The invention still further provides means for conditioning each register means to receive and store said electric signals only during such times as are determined by stimuli applied to the apparatus.

According to a further feature of the invention the register means is conditioned to receive and store said electric signals only during such times as are determined by the state of the register means consequent upon the receipt thereby of signals produced other than by said recording means.

The invention further consists in a register-translator for a telephone system which comprises a register-transmitter which is connected to information recording means arranged to produce continuously a series of electric signals each of which represents an item of the recorded information whereby the various items of said information are successively reproduced as electric signals which are received and stored by the register-transmitter only during such part of each cycle of transmission of signals by the recording means as is determined by the condition of the register-transmitter consequent upon the reception thereby of sginals produced other than by the recording means.

The invention provides a telephone system in which a plurality of register-transmitters are permanently connected to the recording means to receive signals therefrom.

The invention still further consists in such other features as are disclosed in the following description and accompanying drawings of a register-translator for a telephone system which is given as an example of the invention.

DRAWINGS

In the accompanying drawings Fig. 1 is a block schematic diagram showing a register-transmitter connected to a memory. The numerals inserted in the blocks are the figure Nos. of the various figures which show the electrical connections within said blocks. The principal electrical connections are shown as single lines identified by the adjacent codes. Arrow heads have been inserted in said lines to indicate the direction of the stimulus transmitted thereby.

Figs. 5 to 27 when arranged in the order shown in Fig. 4 show the elecrical connections of the complete register-translator. It is to be understood that like designated leads on adjacent drawings are connected together.

FIRST SELECTOR (FIG. 7)

Figure 7:
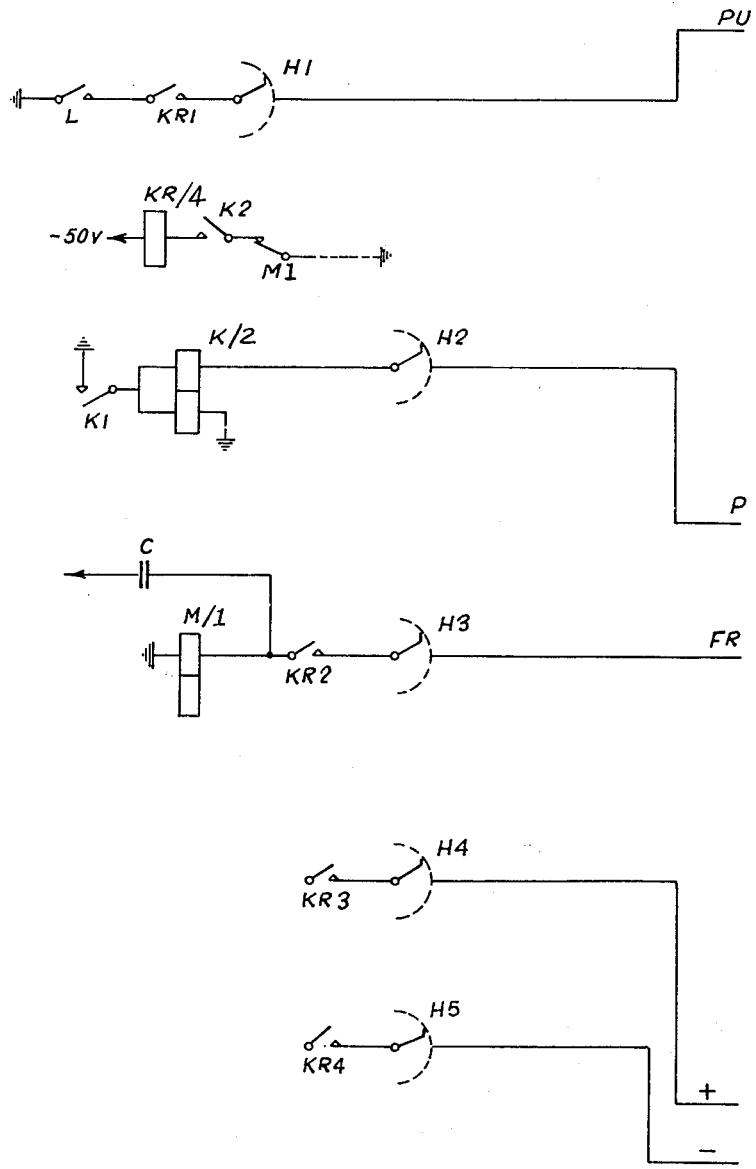

Referring now to Fig. 7, in which all relay contacts are shown in their rest position when a subscriber on the telephone system lifts his handset to make a call, his telephone is connected first to a 1st code selector which then closes contact and starts the rotation of a uniselector, the levels of which are marked H1 to H5 in Fig. 7, the uniselector rotating until its wipers are positioned on a free outlet. In this case the free outlet is a register-transmitter according to the invention, the register-transmitter together with the memory, replacing the A digit switch and the director of the known system. The free condition is indicated by a potential of 50 volts negative with respect to earth which is applied to the P-wire and when the uniselector wipers are positioned on a free register-transmitter, relay K/2 operates, stops the rotation of the uniselector, closes contact K1 to make the potential of the P-wide near earth potential thus indicating to other 1st code selectors that the register-transmitter is engaged, and closes contact K2 to operate relay KR/4. Contact KR1 closing extends the earth via contact L over the lead PU into the register. Contract KR2 connects one end of a winding on relay M and one side of condenser C over the lead FR to register-transmitter, which by operations described below applies dial tone to the lead FR, the tone being heard by the subscriber via condenser C. The other end of the winding on relay M/1 is shown connected to earth. In the known system it is connected to the 50 volt exchange battery but connection to earth is more convenient but not material to the present invention. Contacts KR3 and KR4 connect the register-transmitter to the 1st code selector over the leads marked + and —. These wires are looped in the register-transmitter at this stage as will be described later.

SUBSCRIBER CALLING OPERATION

The further operations by the subscriber to establish a talking connection to clear the call are communicated to the register-transmitter by the opening and closing of contact L. If the subscriber replaces the handset of his telephone, contact L opens. If the subscriber operates his dial, for each operation contact L opens and closes the number of times corresponding to the digit dialled in the known manner. The further operations which the subscriber may perform according to the present invention are more extensive than those permitted by the known system and will now be described.

The connections which a calling subscriber may wish to make may be divided into three classes. The first class, which will be called local, comprises connections to subscribers in the same local switching network. For this class of call the calling subscriber dials local code digits designating the exchange to which the wanted subscriber is connected followed by numerical digits corresponding to the digits of the number on that exchange of the wanted subscriber. The second class of connections, which will be called trunk, comprises connections to subscribers outside the same local switching network to which the calling subscriber is connected. For this class of call the calling subscriber dials local code digits indicating that a trunk call is required, followed by trunk code digits designating the exchange to which the wanted subscriber is connected followed again by the numerical digits of the wanted subscribers' number. The third class of connections, which will be called service, comprises connections other than to subscribers, for example, to operators for special services. For this class of call the calling subscriber dials only code digits. In telephone systems it is of advantage if the codes do not have all to be comprised of the same number of digits and if the subscribers' numbers on their local exchanges do not also have to be comprised all of the same number of digits. On the other hand, complete freedom in the choice of numbers of digits for codes and exchange numbers is unnecessary and some restriction is essential in the interest of economy and simplicity of the apparatus which has to be provided. In the embodiment of the present invention about to be described by way of example the numbers of digits comprising codes and exchange numbers are as follows. For local connections, there will always be three code and four numerical digits. For trunk connections, there will always be three local code digits, followed by a trunk code which may be comprised of varying numbers of digits and again followed by numerical digits of varying number of digits. For service connections, the code may be one, two or three digits at will.

After lifting his receiver, thus connecting his telephone to a register-transmitter via a first code selector and hearing the dial tone as already described, a calling subscriber wishing to make a local connection proceeds to dial the local code digits followed by the numerical digits. These digits are repeated into the register-transmitter. When the last of the code digits has been received in the register, the transmitter commences to emit trains of impulses over the leads marked + and — in Fig. 7, each impulse comprising the brief opening of the loop by which these wires are joined in the transmitter. Each train of impulses will be called a translation digit. In well-known manner the translation digits serve to establish connection to the wanted subscriber's exchange, and are followed by the four numerical digits which are re-transmitted by the transmitter in order to select the wanted subscriber's line. The register-transmitter then disconnects itself from the 1st code selector. The number of translation digits which may be used for each code is limited only by the amount of equipment provided and in the example to be described is limited to eight. A calling subscriber wishing to make a trunk connection proceeds to dial the local code of three digits designating a trunk connection followed by the trunk code and numerical digits of the required connection. When the last of the local code digits has been received in the register, the transmitter emits translation digits which route the call to the trunk exchange. The trunk code and numerical digits are then retransmitted to the trunk exchange, in which is located register-translator apparatus capable of translating the trunk code. The register-translater releases itself after transmitting the last of the numerical digits. A calling subscriber wishing to make a service call, dials the code digits into the register-transmitter, which sends out the appropriate translation digits and then releases itself.

If the calling subscriber dials a spare local code for which there is no translation, the register-translator applies a potential to the FR lead Fig. 7, to operate relay M/1 which causes the 1st code selector to release the register-transmitter and send number unobtainable tone to the subscriber.

The translation digits corresponding to each of the local codes are made known to the transmitter by the memory in which all the translation digits and call digits are recorded.

MEMORY DEVICE (FIGS. 1, 2, 3)

Figure 1:
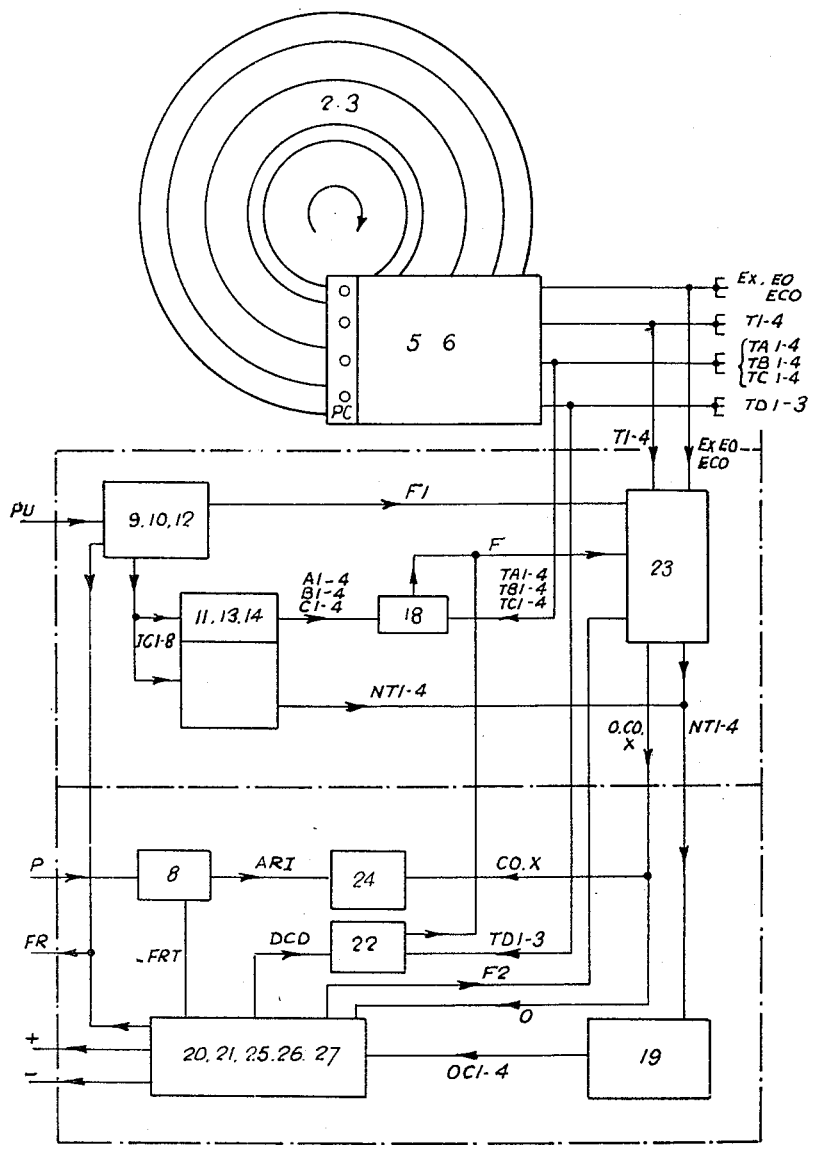
Figure 2:
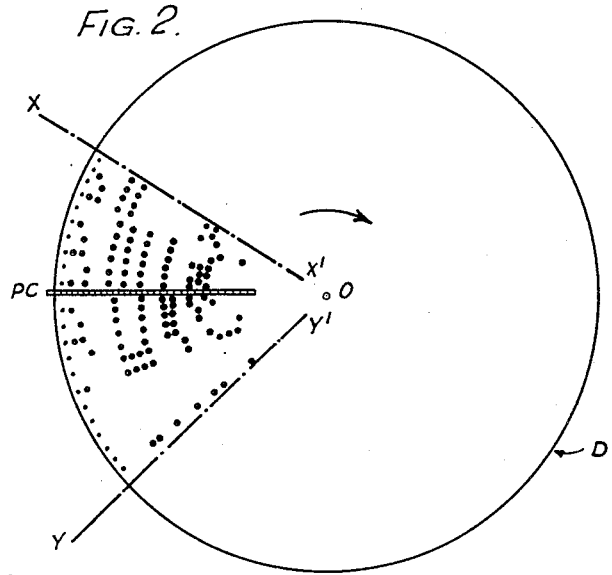
Fig. 2 shows a preferred form of the memory.

Referring now to Fig. 2, which shows a preferred form of the memory, D is a thin metal disc rotating at the rate of several revolutions per second about the axis C and having the information recorded on it in the form of punched or drilled holes. Each item of information is recorded by holes along a radial line, each hole being placed at one of a plurality of fixed radial distances from the centre O. The holes thus also are arranged in a series of concentric tracks about the common centre O. Fig. 2 shows a section of disc punched with holes between the radii $XX^1$ and $YY^1$. A radial line of photo-cells, one to each of the concentric tracks and represented by PC in Fig. 2, scan the disc as it rotates. The scanning arrangements are not shown in detail but it may be taken that light passes through each hole and on to its appropriate photo-cell as it passes the scanning point.

Figure 3:
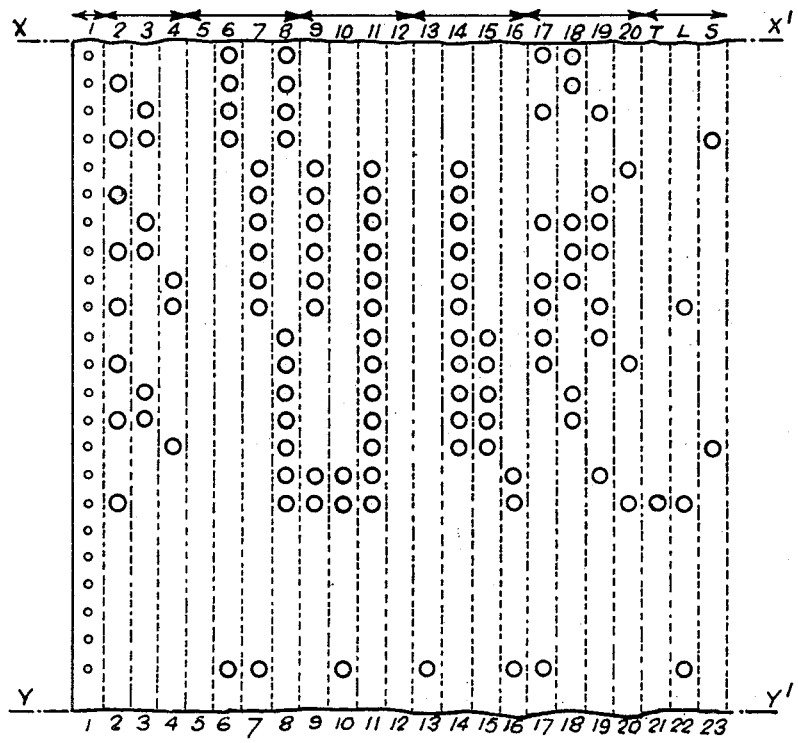
Fig. 3 is a detailed example of the manner in which blocks of information are recorded on the memory.

The punchings in Fig. 2 between the radii $XX^1$ and $YY^1$ show an example of the way in which information is recorded on the disc. Fig. 3 is a rectangular developement of the punchings to a large scale to show the system of recording in greater detail. Referring now to Fig. 3, there are twenty-three concentric tracks numbered 1 to 23. In the outer track, number 1, a hole smaller than those in other tracks is punched at the end of the centre line of each radial strip. The photo-cell associated with this track produces a short pulse as each hole in the track is scanned. This pulse serves to mark the instants that radial strips are being centrally scanned. The holes along a radial line in tracks 5, 6, 7 and 8 represent the first digit, called the A digit, of a code in binary notation. The punching system in this notation is shown in Table 1 below, in which column 1 shows the decimal number, column 2 the letter equivalent of the decimal numbers used in Great Britain and columns 3, 4, 5 and 6 show the positions of the holes punched in tracks 5, 6, 7 and 8 respectively to represent the decimal numbers and letter in columns 1 and 2, a hole being represented by a circle.

*Table 1*

| Column 1 | Column 2 | Columns | | | |
|---|---|---|---|---|---|
| | | 3 | 4 | 5 | 6 |
| 1 | | O | | | |
| 2 | A,B,C | | O | | |
| 3 | D,E,F | O | O | | |
| 4 | G,H,I | | | O | |
| 5 | J,K,L | O | | O | |
| 6 | M,N | | O | O | |
| 7 | P,R,S | O | O | O | |
| 8 | T,U,V | | | | O |
| 9 | W,X,Y | O | | | O |
| 0 | O | | O | | O |

The holes punched along a radial line in tracks 9, 10, 11 and 12 represent the second digit, called the B digit, of a code, and those in tracks 13, 14, 15 and 16 the third digit, called the C digit, of a code, in the binary notation just described. The holes punched along a radial line in tracks 17, 18, 19 and 20 represent the translation digits also in the binary notation just described. The number of translation digits corresponding to any one code varies according to the code. The first translation digit to be transmitted by the transmitter is called translation digit 1, the second translation digit 2 and so on. A radial strip is allocated to each translation digit and its digit number is identified by the holes punched in tracks 2, 3 and 4 in the notation given in Table 2 in which column 1 shows the translation digit numbers and columns 2, 3 and 4 show the positions of the holes punched in tracks 2, 3 and 4 respectively to represent the digits numbers in column 1, a hole being represented in Table 2 by a circle.

*Table 2*

| Column 1 | Columns | | |
|---|---|---|---|
| | 2 | 3 | 4 |
| 1 | | | |
| 2 | O | | |
| 3 | | O | |
| 4 | O | O | |
| 5 | | | O |
| 6 | O | | O |
| 7 | | O | O |
| 8 | O | O | O |

The holes in a radial strip and in tracks 2 to 20 inclusive therefore record one item of information comprising the translation digit and the translation digit number corresponding to a code which is also recorded. Each strip carrying the highest numbered translation digit of a local code has a hole punched in track 22. Punchings in track 22 are called local end orders and serve to indicate to the transmitter that the translation digit being scanned is the last to be transmitted for the code then being scanned. Similarly, each strip carrying the highest numbered translation digit of a trunk code has holes punched in tracks 21 and 22, punchings in track 21 being called trunk end orders. Similarly each strip carrying the highest numbered translation digit of a service code could have a hole punched in track 23 to represent the service end order, but for reasons of economy of apparatus in the register-transmitter, the service end orders are punched in track 23 in radial strips carrying the code, but no translation digit, that is, no holes are punched in tracks 17, 18, 19 and 20, but a translation digit number one in excess of the highest numbered translation digit corresponding to the code. The strip by strip information recorded on the disc on tracks 2 to 23 inclusive and reading from XX¹ to YY¹ can be verified to be as given in Table 3.

*Table 3*

| Translation Digit Number | Code Digits | | | Translation Digit | End Order |
|---|---|---|---|---|---|
| | A | B | C | | |
| 1 | O | | | 3 | |
| 2 | O | | | 2 | |
| 3 | O | | | 5 | |
| 4 | O | | | | Service. |
| 1 | G=4 | L=5 | A=2 | 8 | |
| 2 | G | L | A | 4 | |
| 3 | G | L | A | 7 | |
| 4 | G | L | A | 6 | |
| 5 | G | L | A | 3 | |
| 6 | G | L | A | 5 | Local. |
| 1 | T=8 | I=4 | M=6 | 5 | |
| 2 | T | I | M | 9 | |
| 3 | T | I | M | 2 | |
| 4 | T | I | M | 2 | |
| 5 | T | I | M | | Service. |
| 1 | T=8 | R=7 | U=8 | 4 | |
| 2 | T | R | U | 8 | Trunk and Local. |
| Spare Strip | | | | | |
| Do | | | | | |
| Do | | | | | |
| Do | | | | | |
| Do | | | | | |
| 1 | M=6 | A=2 | Y=9 | 1 | Local. |

As each strip carries a self-contained item of information, it may occupy any position on the disc and is not limited to the regular order shown by way of example.

Figure 5:
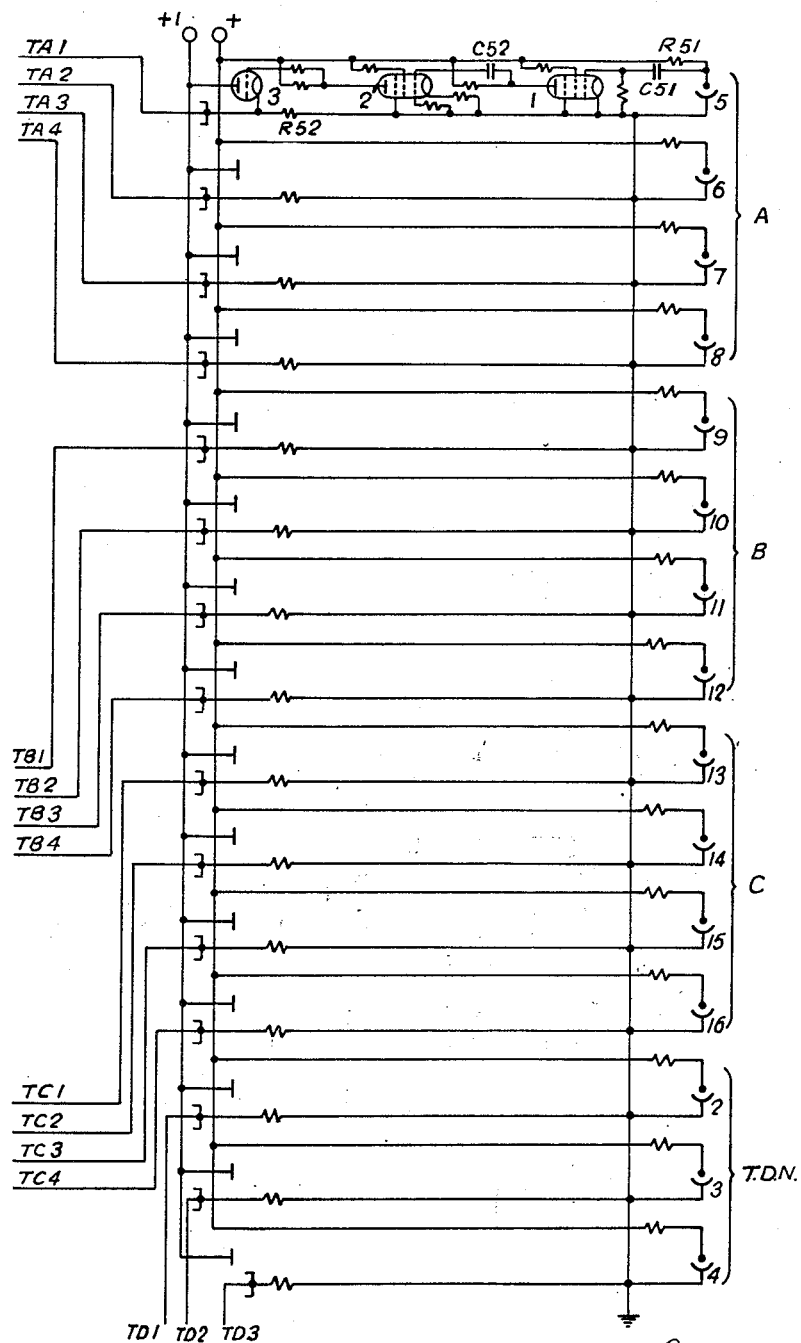
Figure 6:
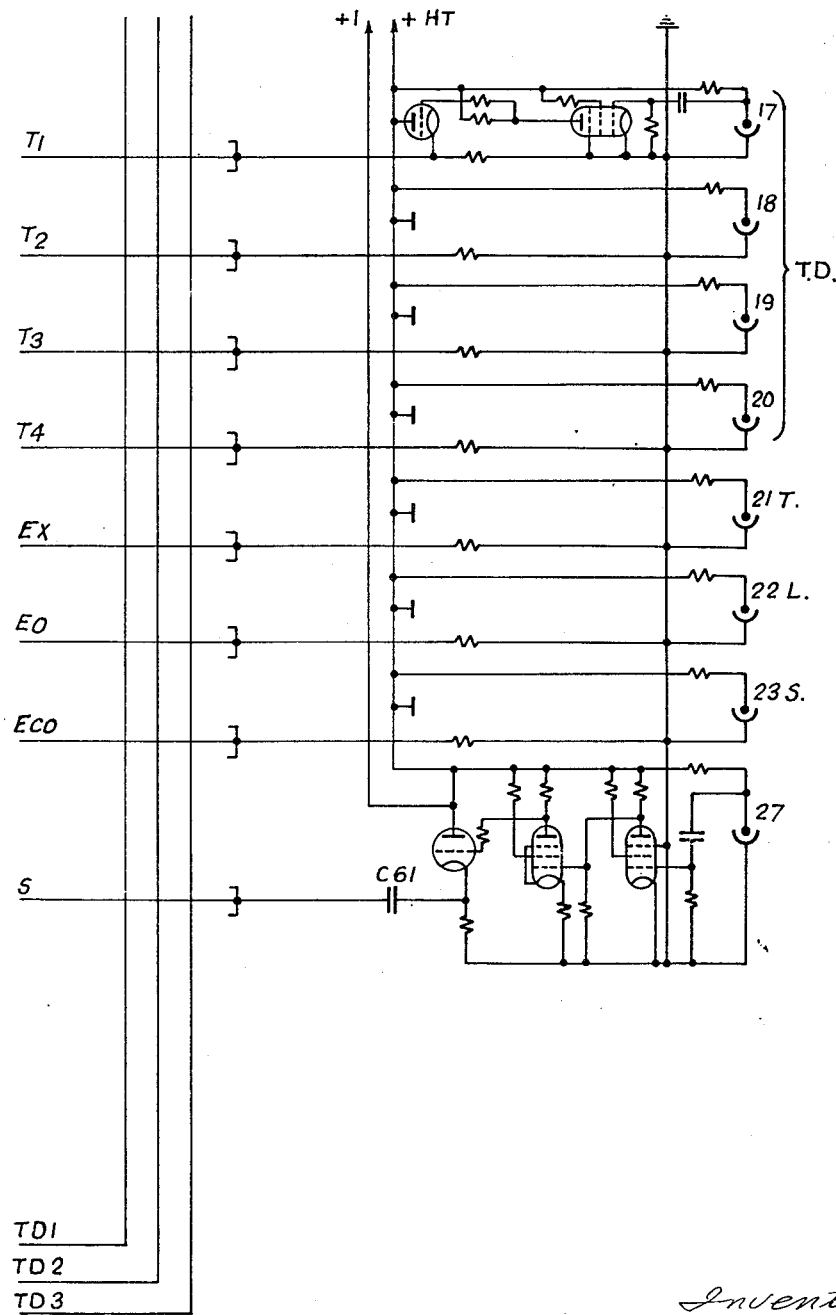

Figs. 5 and 6 together show the photo-cells and amplifiers which scan the disc, each photo-cell in the diagrams being marked with the number of the track which it scans. Each photo-cell output is amplified. Referring to Fig. 5, photo-cell 5 is joined on one side to earth potential and on the other side via a resistor R51 to a potential +, positive with respect to earth potential. Light passing through a hole and falling on photo-cell 5 causes a negative pulse to be developed across the photocell. The negative pulse is applied via condenser C51 to the control grid of 1, producing in the anode circuit of that tube a positive pulse which is applied via condenser C52 to the control grid of tube 2, producing in turn in the anode circuit of that tube a negative pulse which is applied directly to the grid of the cathode follower tube 3, the anode of which is connected to a potential + 1 more positive than potential +, finally producing a negative pulse at the cathode of valve 3 which is joined via resistor R52 to earth and via common lead TA1, to all the register-transmitters. The steady potential of lead TA1 is approximately that of the + positive potential, and drops during a pulse nearer to earth potential. The photo-cells and amplifiers for all tracks numbered 2 to 16 inclusive are similar to that numbered 5 and just described, and emit pulses over the common leads TD1, TD2, TD3, TA1, TA2 TA3, TA4, TB1, TB2, TB3, TB4, TC1, TC2, TC7 TC4 respectively.

Referring to Fig. 6, photo-cell 21 and its amplifier are similar to that of photo-cell 5 and its amplifier, but associated with photo-cell 21 is a condenser C61 which is interposed between the cathode of the cathode follower output tube and the common leads S. Photo-cells 17 to 23 have amplifiers each having one less amplifying valve than has the amplifier described in connection with photocell 5. The final output cathode followers which emit pulses over the common leads T1, T2, T3, T4, EX, EO, ECO respectively therefore emit positive pulses and have a steady value which is near earth potential, and a potential near the + positive potential during the pulse time.

It will be appreciated that the apparatus of Figs. 2, 5 and 6 constitute a memory which serially, cyclically and continuously emits in the form of electrical currents over the common leads enumerated the information which has been stored in it by a previous operation of punching or drilling holes in the metal disc.

DEFINITIONS AND CONVENTIONS

Figure 17:
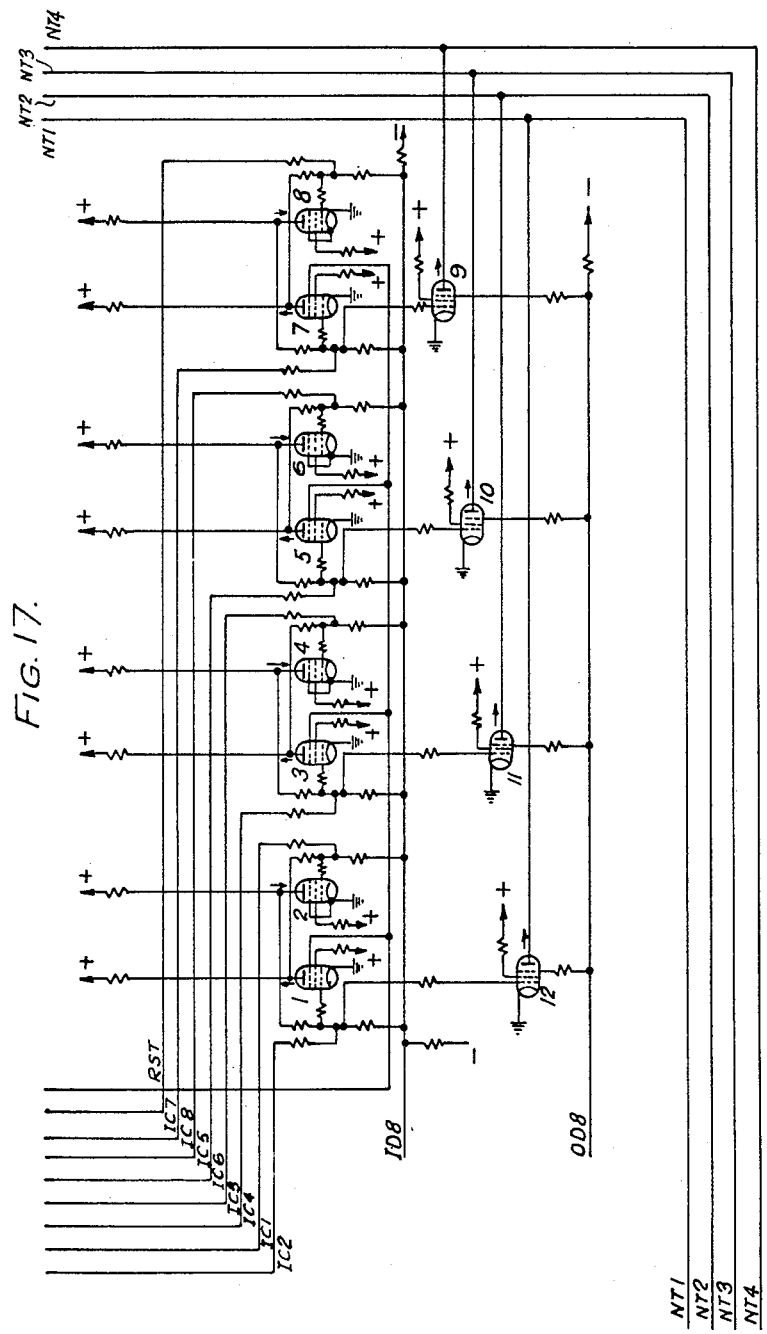

Description of the register-transmitter in detail will be facilitated by the following remarks and conventions which apply to all the drawings:

(1) In order to simplify the drawings and to facilitate understanding of the description the tubes will be referred to by their number on a figure of the drawings with the number of that figure given in brackets, thus tube 10 on Fig. 17 will be described as valve 10(17).

(2) All tubes are used as switches so that they are intended at all times to be either cut-off or fully conducting on the anode circuit. The quiescent conditions of a tube, that is, its condition when the register transmitter is available to be seized from a 1st code selector but has not been so seized, is indicated by an arrow placed alongside its anode. An arrow pointing towards the anode represents conduction which will be called the on condition, and pointing away from the anode represents the cut-off condition, which will be called the off condition, in the quiescent state.

(3) In addition to the + and +1 positive potentials already mentioned, there are two negative potentials − and −1 of about the same potential negative as the + and +1 potentials are respectively positive with respect to earth. There is also the −50 v. potential derived from the normal 50 volts negative with respect to earth exchange battery supply.

(4) A trigger circuit comprises a pair of tubes each having at least a cathode as control grid and an anode, each having an anode load resistor and each having its anode connected via a resistor to the control or to a suppressor grid of the opposite tube of the pair, the said grids of each tube being connected via a resistor to a negative biasing voltage, the tubes, resistors and power supply potentials being so chosen that the circuit has two states of stable equilibrium in each of which state one tube is conducting and the other is cut-off. The trigger will be said to be released when the conducting and cut-off tubes correspond to the arrows shown placed beside the anodes of the two valves and said to be operated when the tubes are in the opposite condition.

(5) A pulse trigger circuit is similar to a trigger circuit except that of the two resistors, one each from the anode of one tube to the control grid of the opposite valve, one at least is replaced by a condenser, and the bias voltages of the two tubes are made unequal, the whole assembly being so chosen and arranged that when disturbed from its released condition to its operated condition by an impulse applied to the circuit, it returns to the released condition without requiring further stimulus after a time determined chiefly by the resistances and capacitances in the control grid circuits and thus emits a pulse at the anode of each of the tubes.

(6) A counter trigger is a binary counter comprising a trigger circuit adapted to change from either of the stable equilibrium conditions in which it happens to be, to the other stable condition when a pulse from a driving cathode follower is applied via condensers to each of the control grids of the two tubes. Counter triggers of the type used in this invention are fully described in the specification of British Patent No. 584,704. A trigger circuit of any type will be referred to by the numbers of the tubes which it includes. For example trigger 14 and 15(8) is the counter trigger circuit shown in Fig. 8 and including tubes 14 and 15.

(7) The two tubes of a trigger will be identified when necessary as the up and down tubes, the up tube being the one which is off in the quiescent-state, and the down tube the one which is on.

(8) The circuits about to be described comprise electronic tubes and other components interconnected to perform the desired functions. Two points in a circuit will be said to be D. C. connected or coupled when they are joined together directly or via a single resistor, for example, a grid or other resistor. Two points will also be said to be D. C. connected or coupled when one is connected to one end of a potentiometer, the other end of which is connected to a suitable potential and the other of said points connected to a point on the potentiometer, a type of coupling which frequently occurs as an intervalve coupling, the object of the potentiometer being to bring the operating potentials of tube electrodes to within suitable ranges. The term pulse connection will be used to describe a connection or coupling which includes at least one series connected condenser.

ENGAGING AND FORCED RELEASE TIMING MEANS (FIGS. 7–8)

Figure 8:
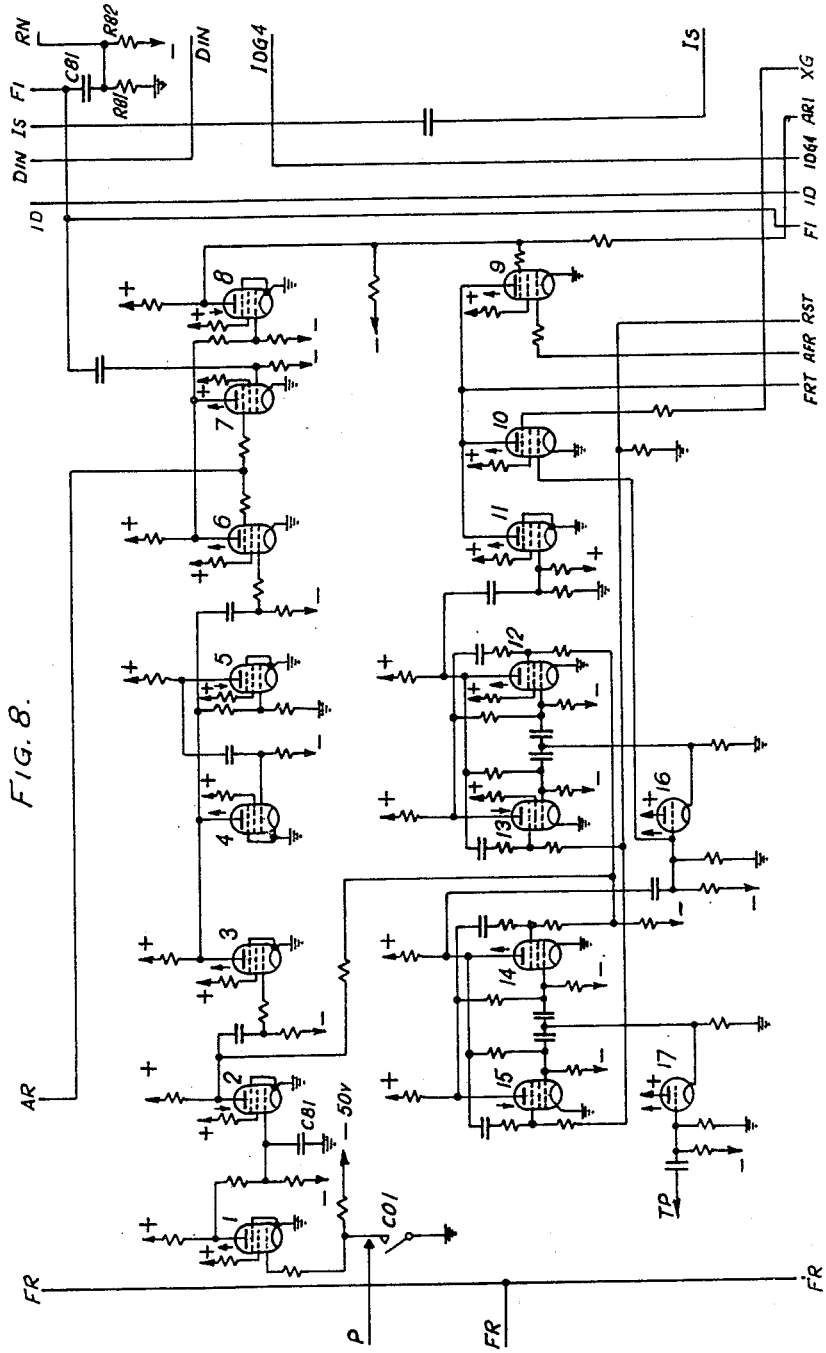

Referring again to Fig. 7 and as already described in the quiescent condition the lead P will be at the −50 volt potential. When the uniselector is positioned on the bank contacts connected to a free register-transmitter, the −50 volt potential operated relay K/2 closes contact K1 and causes the potential of the P lead to become near earth potential. Referring now to Fig. 8, the lead P assuming a near earth potential and being connected via a grid resistor to the control grid of tube 1(8) switches this tube on. The anode of valve 1(8) is D. C. connected to the grid of tube 2(8) and hence this latter valve is switched off when the former tube is switched on. A condenser C81 connected between the control grid of tube 2(8) and earth, renders that tube insensitive to momentary surges on the P wire. The anode of tube 2(8) is D. C. coupled to the suppressor grid circuit of the up tube 14(8) of the counter-trigger circuit 14 and 15(8) the coupling being designed so that when tube 2(8) is on the suppressor grid potential of tube 14(8) is negative with respect to its cathode and therefore switches the tube off thus setting and keeping the counter trigger in its released condition, and when tube 2(8) becomes non-conducting as just described, the steady suppressor grid voltage on tube 14(8) is at or near the cathode potential thus permitting the counter trigger circuit to function as a counter trigger. A counter trigger driving tube 17(8) is pulse connected over lead TP to a clock not shown which generates a positive pulse every 30 secs. When tube 2(8) is off as previously described, the clock pulses are permitted to drive the counter trigger. The up tube of counter-trigger 14 and 15(8) is pulse connected to the driving tube 16(8) of the counter trigger 12 and 13(8), of which tubes 13(8) and 12(8) are the down and up tubes respectively. The suppressor grid of tube 12(8) is D. C. coupled to the anode of tube 2(8) by reason of which the counter trigger 12 and 13(8) is subject to the same control from tube 2(8) as has just been described for counter trigger 14 and 15(8).

Figure 9:
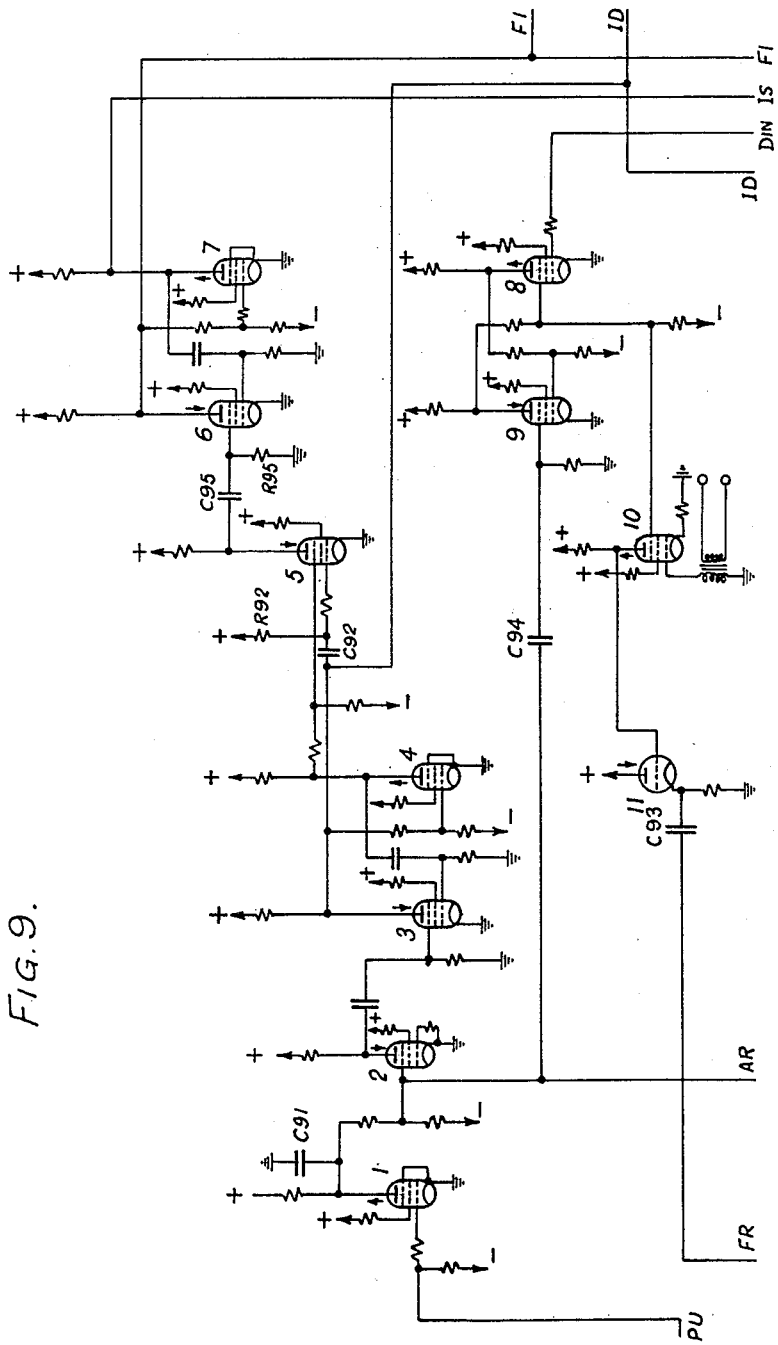

DIAL TONE FEEDER, INPUT DIGIT PULSE COUNTER AND INPUT DIGIT TRAIN COUNTER (FIG. 9)

Referring again to Fig. 7 and as already described, the PU lead is disconnected from earth in the quiescent condition, is earthed when a free register-transimtter is connected, is disconnected from earth if the subscriber replaces his handset on the telephone and is given disconnection pulses when the subscriber operates his dial. Referring now to Fig. 9 lead PU is connected via a grid resistor to the control grid of tube 1(9) and via a lead resistor to the battery. When lead PU is earthed for the first time, by the operation of relay KR/4 tube 1(9) is changed from the off to the on condition. A condenser C91 forming part of the anode load of valve 1(9) prevents the effects of varying resistance or contact bounce at contact L in Fig. 7 from being communicated from the anode of tube 1(9) to the rest of the circuit. The anode of tube 1(9) is D. C. coupled to the suppressor grid of tube 2(9). The switching on of valve 1(9) switches off tube 2(9) which however has no function to perform at this stage. The anode of tube 1(9) is pulse connected to the suppressor grid of tube 9(9), which is, the down tube of the trigger 8 and 9(9). At this stage the control grid of tube 8(9) is at earth potential. When tube 1(9) is switched on as above, a negative pulse via condenser C94 operates trigger 8 and 9(9), by momentarily switching off tube 9(9). The anode of tube 9(9) is so D. C. connected to the suppressor grid of tube 10(9) that when valve 9(9) is switched on the said suppressor grid potential is reduced to a value sufficient to switch off tube 10(9) and when valve 9(9) is switched off, said suppressor grid is raised to substantially earth potential. Tube 10(9) is an amplifier driven on the control grid by interrupted alternating current, known to those familiar with telephone circuits as dial tone, and applied via a transformer. When valve 1(9) is switched on as above, therefore, tube 10(9) is permitted to function as an amplifier and drives the cathode follower tube 11(9). Tube 11(9) therefore commences to pass dial tone current, via condenser C93, lead FR and condenser C, Fig. 7, to the calling subscriber line.

For ease of further description it will be assumed that the calling subscriber wishes to make a local connection to a subscriber with the number GLA. 3376. On receipt of dial tone, the calling subscriber proceeds to dial sequentially the digits 452 3376, of which the first three comprise the code. The first digit will be repeated by contact L, Fig. 7, and will switch tube 1(9) off and on four times at the dial frequency. Referring now to Fig. 9, tube 1(9) switches valve 2(9) on and off four times and each time tube 2(9) is switched on a negative pulse is communicated to the suppressor grid of the on tube of the pulse-trigger 3 and 4(9), which trigger is timed to operate for a period much shorter than the normal (66 ms.) break period of the dialled impulse and is therefore in the released condition each time tube 2(9) is switched on. The anode of tube 3(9) is pulse connected to the control grid of tube 5(9), the grid leak resistance R92 of which is connected to + potential. The cathode of tube 5(9) is connected to earth potential and the suppressor grid is D. C. coupled to the anode of tube 4(9) such that when valve 4(9) is off, the suppressor grid of tube 5(9) is at or near earth potential and when tube 4(9) is on the suppressor of tube 5(9) is sufficiently negative to cut off the anode current. It is clear that prior to the pulse-trigger 3 and 4(9) being operated, tube 5(9) is on, but when the first impulse of the digit 4 operates the pulse-trigger 3 and 4(9), tube 5(9) is switched off at its suppressor grid. At the end of its pulse time, pulse-trigger 3 and 4(9) releases, and the negative pulse at the anode of tube 3(9) is communicated to the control grid of tube 5(9) thereby maintaining that tube in the off condition for a period dependent mainly on the values of condenser C92 and resistor R92. This period is chosen considerably to exceed the normal make period of the dialled impulse (33 ms.) and may be given a timing of 100 ms. Thus although when the pulse-trigger 3 and 4(9) releases, the suppressor grid of tube 5(9) is returned to earth potential, valve 5(9) remains off during the pause before the arrival of the second impulse. The second impulse will again make the suppressor grid of tube 5(9) negative with respect to cathode as before and at the end of the impulse the control grid of tube 5(9) will be driven negative again. Tube 5(9) is therefore maintained off during the receipt of a train of impulses with normal spacing. At the end of the train, however, there follows an inter-train pause of approximately 300 ms. or longer. During this period condenser C92 charges through resistor R92 sufficient to permit tube 5(9) to restore to the on condition, thereby operating pulse-trigger 6 and 7(9) via the pulse connection C95, R95 between the anode of tube 5(9) and the suppressor grid of the on tube 6(9). The pulse-trigger 6 and 7(9) has a pulse period of about 50 ms., and is used for purposes to be described later.

INPUT DIGIT BINARY REGISTER (FIG. 10)

Figure 10:
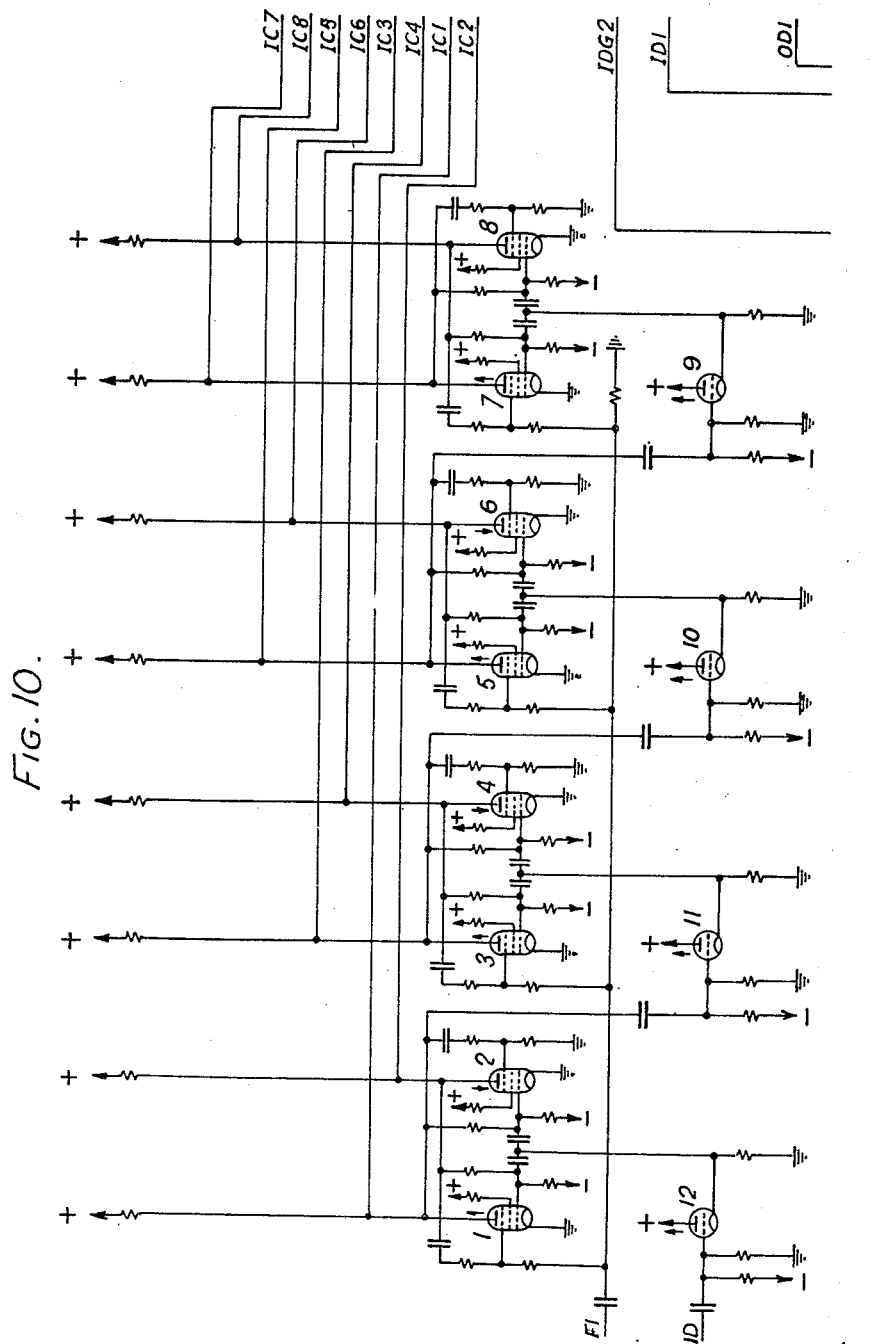

Lead ID, Figs. 9 and 10, pulse connects the anode of tubes 3(9) to the control grid of the cathode follower valve 12(10), which drives the counter-trigger 1 and 2(10). It has been shown above how tube 3(9) is switched off by each impulse received. The receipt of the train of four impulses will therefore result in a succession of four positive pulses being communicated to the control grid of the tube 12(10). Negative pulses will also be communicated thereto each time a pulse-trigger 3 and 4(9) releases but will not alter tube 12(10) which is biassed beyond cut off. The first of the four positive pulses will operate counter-trigger 1 and 2(10), the second will release it and operate counter-trigger 3 and 4(10). The third will operate counter-trigger 1 and 2(10) again. The fourth impulse will release counter-trigger 1 and 2(10) release counter-trigger 3 and 4(10) and operate counter-trigger 5 and 6(10).

The circuit shown in Fig. 10 comprises a binary counter of four scales (i. e. made up four trigger circuits per definition (4) above), capable, as is known to those skilled in the art, of counting a maximum of sixteen impulses before repeating the sequence. In this application of the counter it is required to count only up to a maximum of 10 impulses. The count indication is given by the distribution of potentials on the anodes of the counter-trigger tubes. After a count and further operating to be described, the counter-triggers are released, or reset, by the application of a suitable negative pulse to lead F1, Fig. 10. The relationship between the numbers counted and the counter-trigger anode potentials is shown in the following table where ↑ indicates the up tube and ↓ indicates the down tube.

*Table 4*

| Decimal Numbers | Tube 1 (10) | Tube 2 (10) | Tube 3 (10) | Tube 4 (10) | Tube 5 (10) | Tube 6 (10) | Tube 7 (10) | Tube 8 (10) |
| --- | --- | --- | --- | --- | --- | --- | --- | --- |
| Released position | ↑ | ↓ | ↑ | ↓ | ↑ | ↓ | ↑ | ↓ |
| 1 | ↓ | ↑ | ↑ | ↓ | ↑ | ↓ | ↑ | ↓ |
| 2 | ↑ | ↓ | ↓ | ↑ | ↑ | ↓ | ↑ | ↓ |
| 3 | ↓ | ↑ | ↓ | ↑ | ↑ | ↓ | ↑ | ↓ |
| 4 | ↑ | ↓ | ↑ | ↓ | ↓ | ↑ | ↑ | ↓ |
| 5 | ↓ | ↑ | ↑ | ↓ | ↓ | ↑ | ↑ | ↓ |
| 6 | ↑ | ↓ | ↓ | ↑ | ↓ | ↑ | ↑ | ↓ |
| 7 | ↓ | ↑ | ↓ | ↑ | ↓ | ↑ | ↑ | ↓ |
| 8 | ↑ | ↓ | ↑ | ↓ | ↑ | ↓ | ↓ | ↑ |
| 9 | ↓ | ↑ | ↑ | ↓ | ↑ | ↓ | ↓ | ↑ |
| 0 | ↑ | ↓ | ↓ | ↑ | ↑ | ↓ | ↓ | ↑ |

As stated above, the receipt of digit 4 finally results in the operation of counter-trigger 5 and 6(10) thus inter-changing the potentials which normally exist on leads IC5 and IC6.

SERIAL STORING OF INPUT DIGITS

Figure 11:
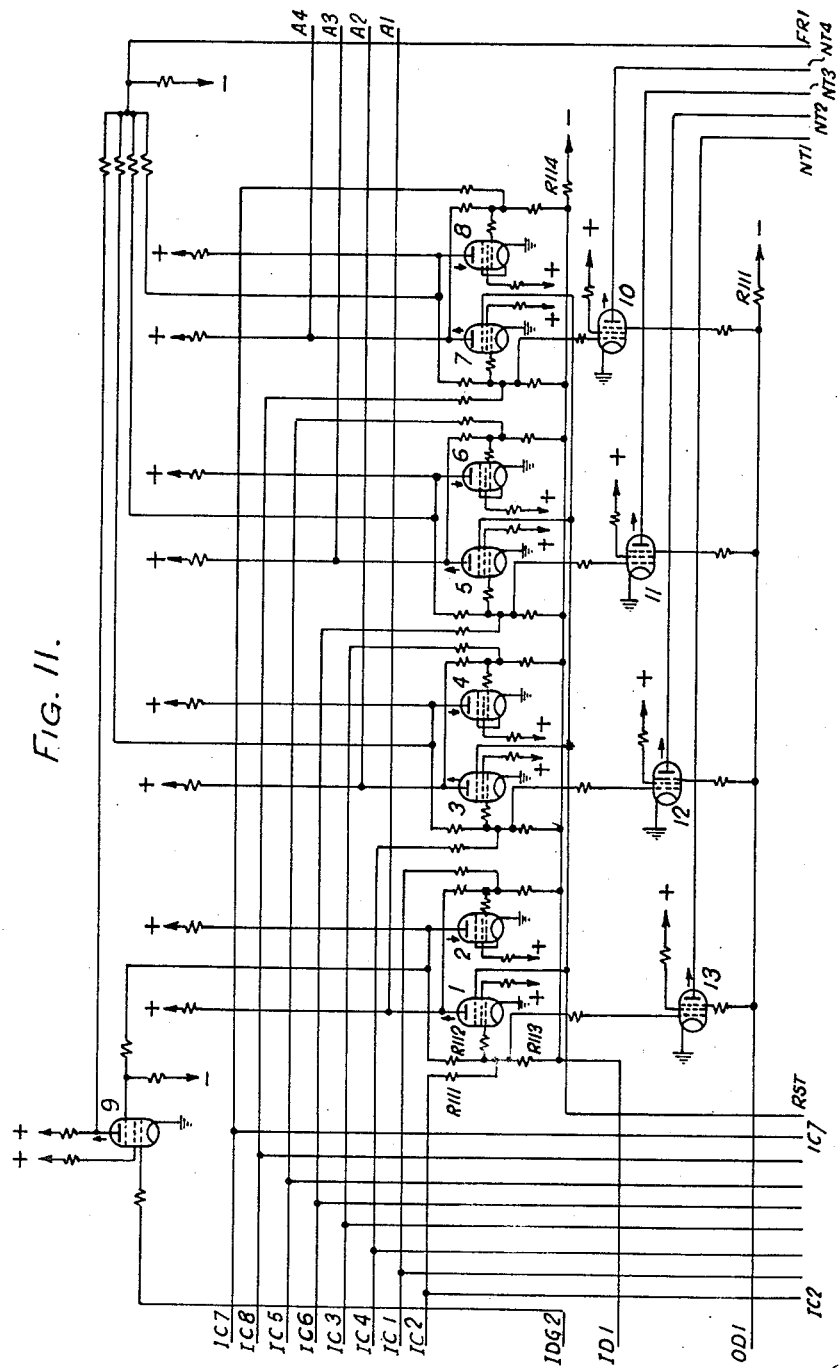

Leads IC1 to 8 are D. C. connected to the control grid networks of triggers 2 and 1, 4 and 3, 6 and 5, and 8 and 7 which are shown in Fig. 11. The suppressor grids of the odd numbered tubes are normally at earth potential maintained over lead RST. Leads IC1 to 8 are also D. C. connected in the same way, that is to say, they are multiplied, to seven other sets of trigger circuits shown in Figures 13, 14, 15, 16 and 17. Referring now to the particular set of triggers shown in Figure 11, the potentials on leads IC1 to 8 will change from a potential near the + potential when derived from an up tube and a potential near earth potential, when derived from a down tube, as the counter, Figure 10, counts the impulses constituting a dialled-in digit and according to the Table 4. The resistors R111, R112, R113 and R114 are so chosen that the said potential changes on lead IC2 normally produce at the control grid of tube 1(11) a small change of potential, insufficient to change the state of equilibrium in which the trigger happens to be. The resistor networks connected to the control grids of all the trigger tubes 1(11) to 8(11) are similar in all eight sets of said triggers to the one described for tube 1(11) of the first set of triggers. The released condition of the triggers in Fig. 11 is tube 1 up valve 2 down, 3 up 4 down, 5 up 6 down and 7 up 8 down. This condition is brought about when required by the application of a negative pulse to lead RST as will be described later. Such a pulse switches off valves 1, 3, 5 and 7 thereby releasing any of the four triggers which may be operated.

In consequence of the potentials on leads IC1 to 8, certain of the above mentioned triggers will, after a dialled impulse train has been counted, be biassed in favour of changing to the operated condition.

It was shown above that the receipt of digit 4 results in an interchange of the potentials on leads IC5 and IC6, the remaining IC leads retaining the potentials corresponding to the released condition. Further description will show how, of the eight sets of triggers which have been biassed in favour of taking up an on-off distribution corresponding with the digit 4, the first set only is made to take up that on-off distribution. In this way the digit 4 is stored on the first set of four triggers. Henceforth, the said sets of triggers will be referred to as the in-coming digit stores or merely as store No. 1, store No. 2 etc.

STORES OPERATION (FIG. 11)

Figure 11 shows that the resistor R113 and the corresponding resistances in the grid circuits of tubes 2 to 8(11) inclusive are connected together and via a resistor R114 to negative potential. A lead ID1 connects the junction of R113 and R114 to the anode of tube 13(12) via a condenser. The cathode of tube 13(12) is connected to earth potential. If now tube 13(12) is switched on for a short period, a negative pulse is developed across R114 causing all eight valves in store No. 1 to switch off momentarily. As the said negative voltage decays, the triggers will take up under the influence of the potentials on leads IC1 to 8, states corresponding to the states of the counter-triggers of Fig. 10. Thus, in the case of digit 4, the triggers 1–2(11), 3–4(11), and 7–8(11) will re-assume the released state, but trigger 5–6(11) will assume the operated state. It will be seen therefore that the discrete block of information, in this instance the digit 4, has been received and stored. In similar manner any digit comprising a succession of dialled impulses 1 to 10 in number will be stored, the numerical indication of the digit being defined by the distribution of potentials existing on the anodes of tubes 1 to 8(11). This distribution corresponds with that on the anodes of the counter tubes 1 to 8(10) as shown in Table 4.

STORES SELECTOR (FIG. 12)

Figure 12:
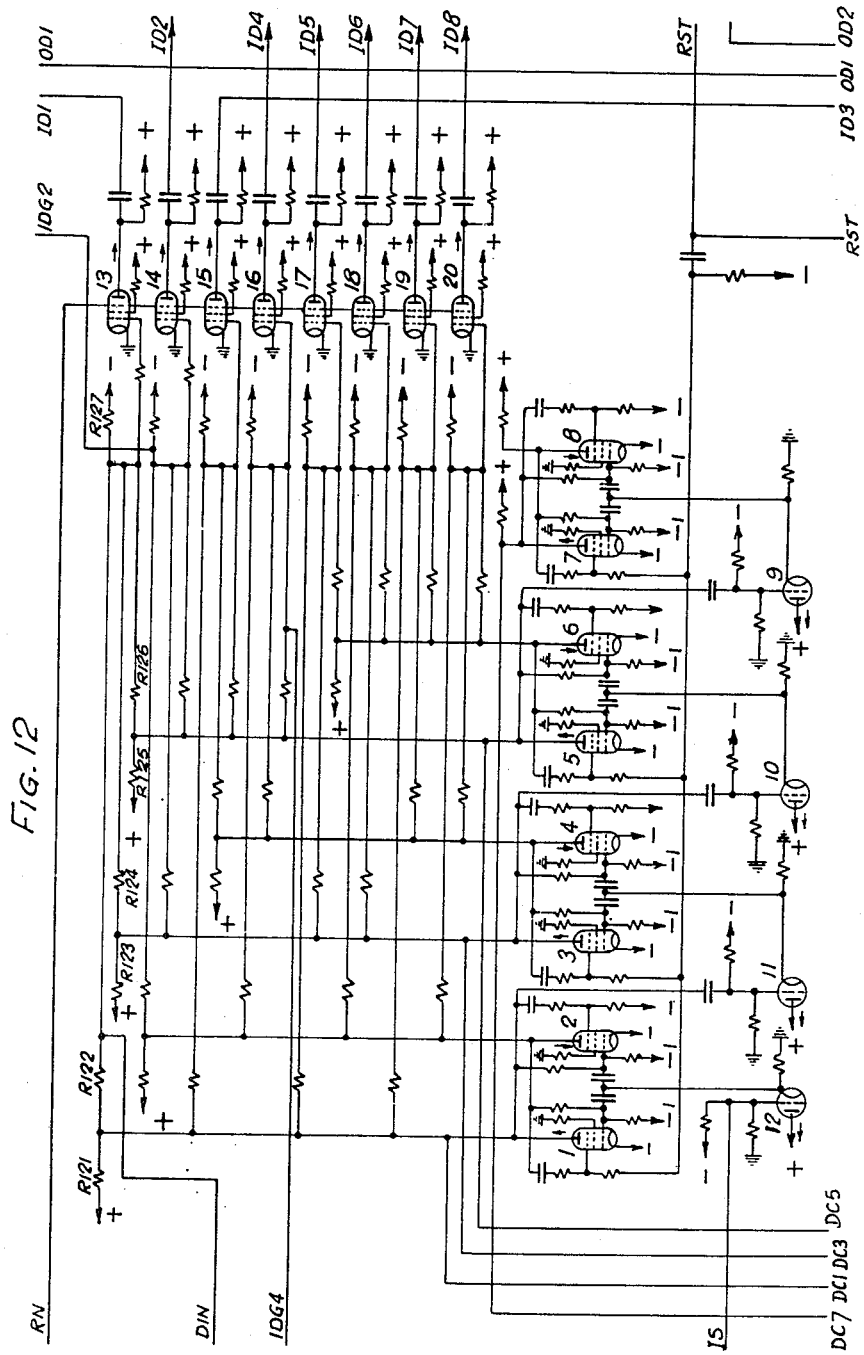
Figure 13:
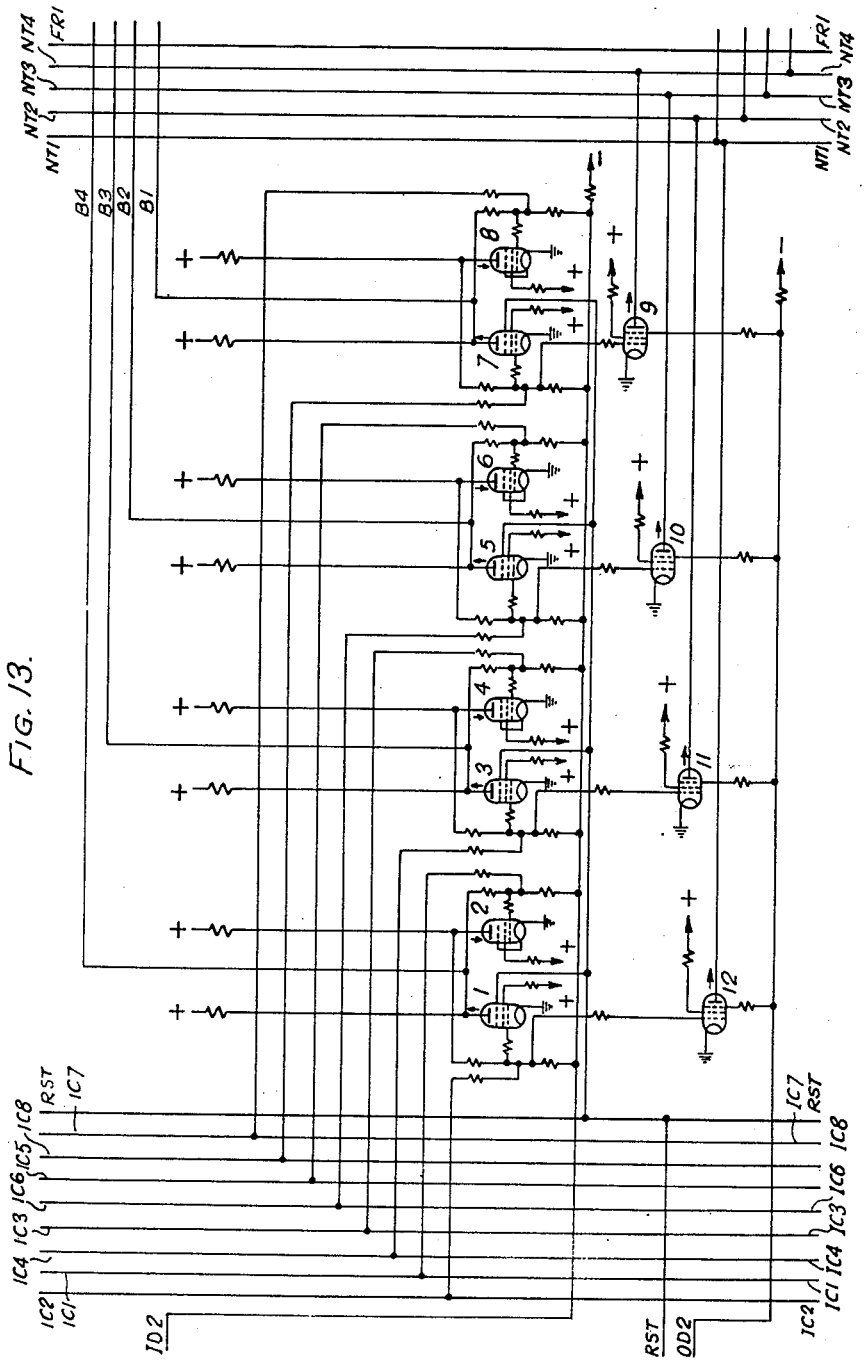
Figure 14:
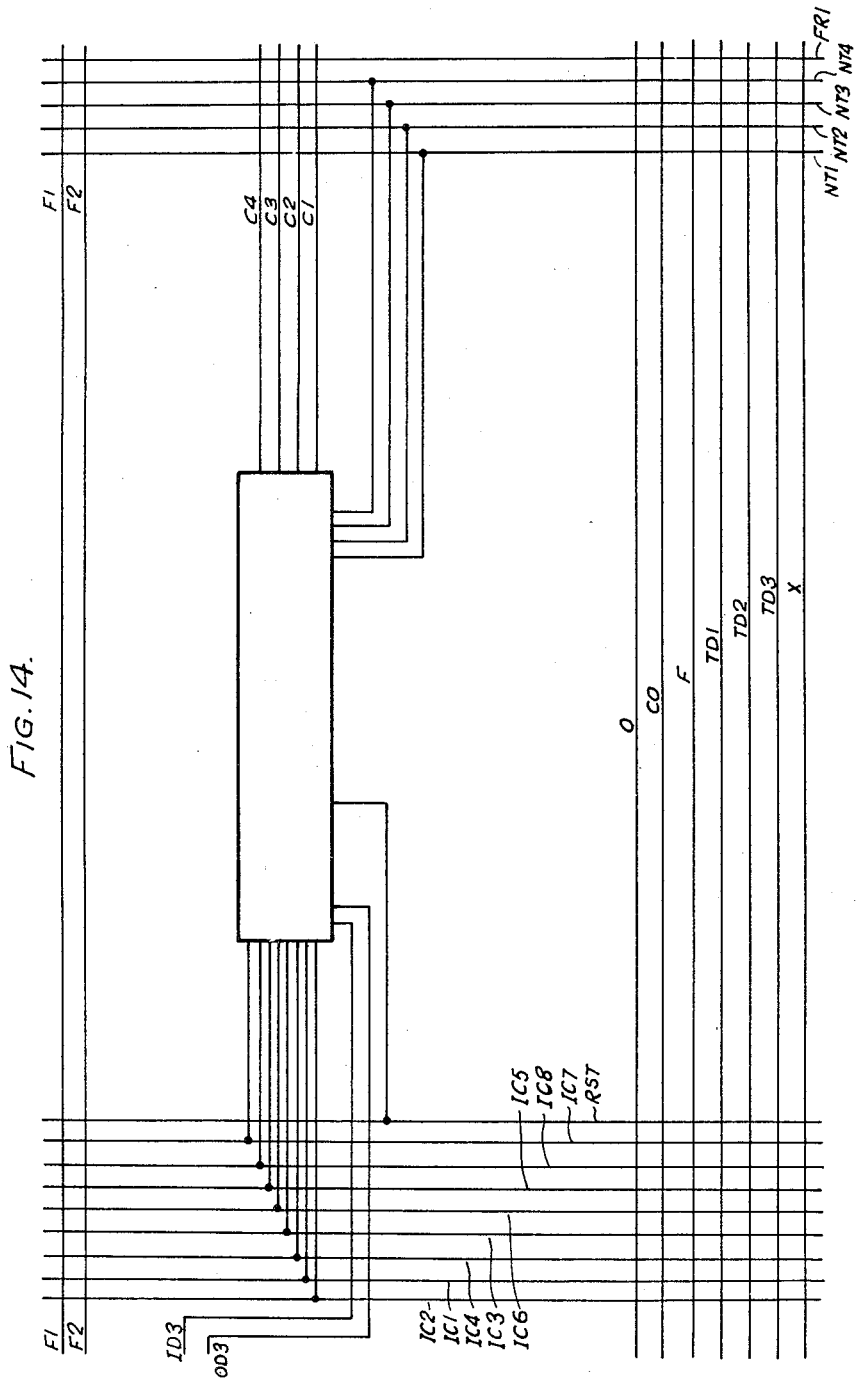
Figure 15:
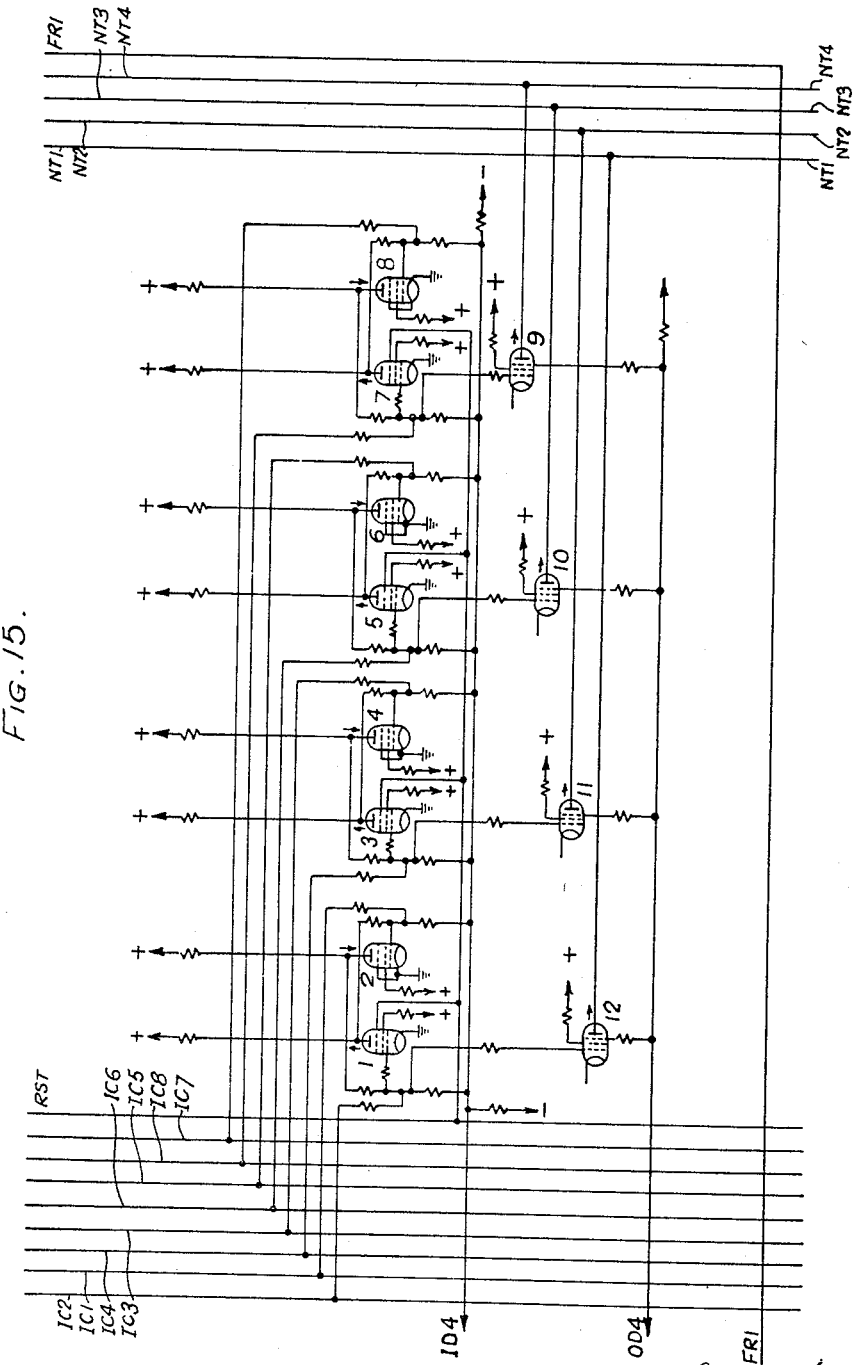
Figure 16:
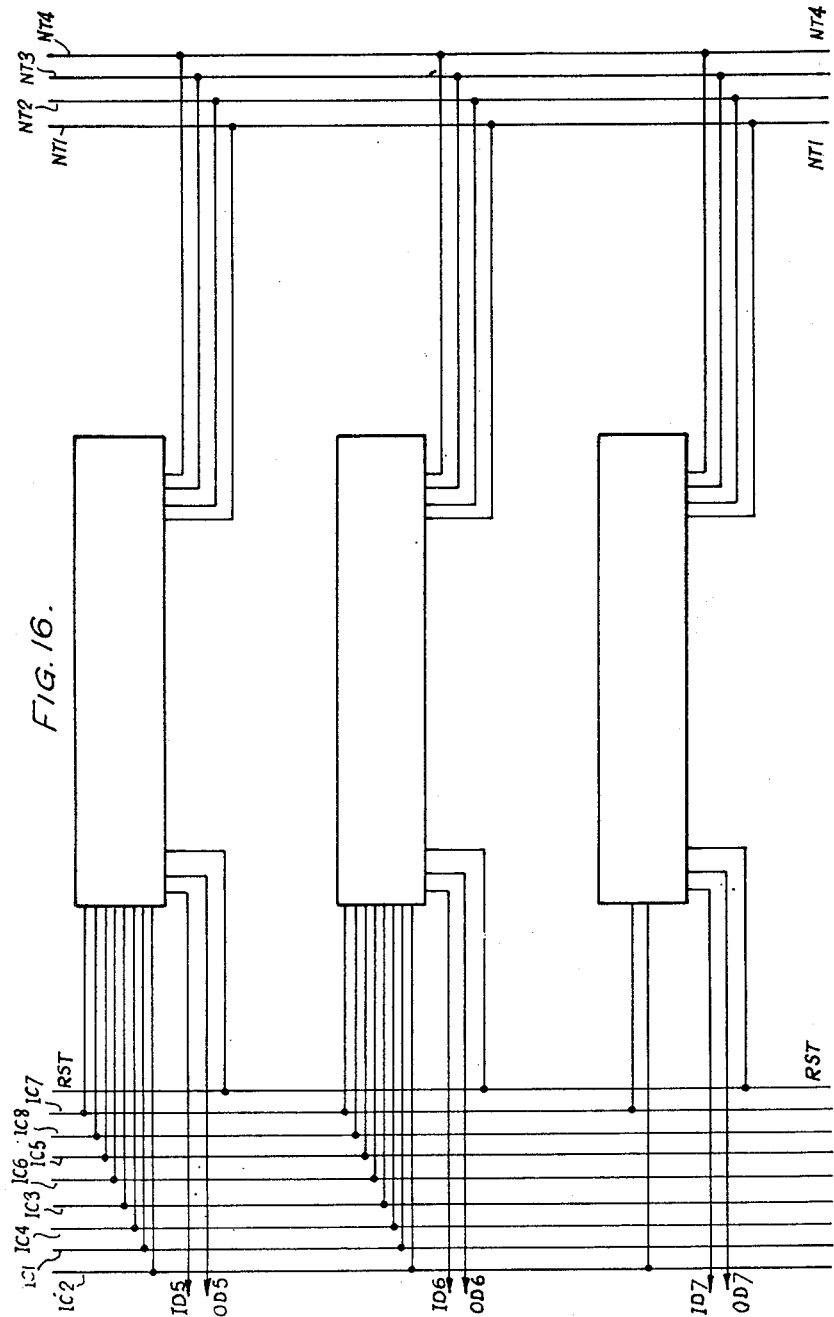

To complete the description of the receiver part of the register it remains to describe how the dialled-in digits are stored successively on the eight stores provided. Reference will now be made to Figure 12 which shows a counter comprising counter triggers 1 and 2, 3 and 4, 5 and 6, 7 and 8. Anode current is supplied to these tubes via resistors R121, R123, R125, etc., from + potential, the cathodes are connected to — potential and the control grids are connected via resistors to —1 potential. Tubes 9(12), 10(12), 11(12), 12(12) are counter driving tubes and their control grids are connected via leads IS to the anode of tube 7(9). Tubes 13(12) to 20(12), which have their cathodes earthed, are the sources of the negative going pulses required to induce the in-coming digit stores to accept the digits impressed on them by leads IC1–8. The suppressor grids of the tubes 13(12) to 20(12), are commoned and connected via lead RN to a potentiometer R81, R82, Fig. 8, which in turn is connected between earth and — potential. The values of R81 and R82 are so chosen that lead RN is normally sufficiently negative with respect to earth to switch off tubes 13–20. The lead RN is also connected to a condenser C81, Fig. 8, the other side of which is connected, via lead F1, to the anode of tube 6(9). The control grids of the tubes 13(12)–20(12) are connected via their grid resistors and resistor networks, such as R122, R124 and R126 to the anodes of the counter tubes 1 to 6(12) and via resistances such as R127 to — potential. The values of the resistors R122, R124, R126 and R127 are chosen so that when valves 1(12), 3(12) and 5(12) are off the potential on the control grid of tube 13(12) is substantially that of the cathode, which is earthed. When however any one or more of the tubes 1(12), 3(12) and 5(12) are on, the potential on the control grid of tube 13(12) is sufficiently negative to switch the said tube off. When, therefore, the counter is released, which condition may be obtained by the application of a suitable negative pulse to lead RST. Fig. 12, the control grid of tube 13(12) is at earth potential. Tube 14(12) is connected via resistors similar to R122, R124, R126 and R127 to the anodes of tubes 2(12), 3(12), 5(12) and — potential respectively. The control grid of tube 14(12) will therefore be at substantially earth potential should the counter be stepped by one impulse on the driving lead IS which is connected to the anode of tube 7(9). For all other positions of the counter the control grid of tube 14(12) will be sufficiently negative to switch the said tube off. Similarly earth potential will be attained by the control grid of valve 15(12) only when the counter has stepped twice. Successive steps of the counter will in turn raise to earth potential the control grids of tubes 16(12), 17(12), 18(12), 19(12) and 20(12).

The counter described in the foregoing paragraph is driven via lead IS Fig. 12 and a condenser by positive going pulses generated at the anode of tube 7(9). It was shown above that the trigger 6 and 7(9) has an operated time of about 50 ms. and is operated for the first time, since connection of the register to the calling subscriber, by a negative pulse from the anode of tube 5(9) nominally 100 milliseconds after the arrival of the last impulse of the first dialled-in digit. When trigger 6 and 7(9) operates, the off tube 7(9) switches on. The resulting negative pulse transmitted over lead IS to the counter driving tube 12(12) has no effect since tube 12(12) is biassed to the off state. Simultaneously tube 6(9) switches off and the resulting positive pulse on lead F1, Fig. 9, is applied via condenser C81, Fig. 8, to lead RN and momentarily raises the potential on the suppressor grids of tubes 13(12) to 20(12) to earth potential. Of these eight tubes, however, only tube 13(12) is able to draw anode current, all the remainder being switched off on the control grids, as explained in the preceding paragraph. In consequence of tube 13(12) drawing anode current a negative pulse is applied via a condenser to lead ID1 thereby causing, as described above, the store No. 1 to accept the digit 4 which is at that moment being impressed on the control grids of all the stores.

About 50 ms. after the pulse trigger 6 and 7(9) has operated, it releases, thereby switching off tube 7(9) and switching on tube 6(9). The negative pulse at the anode of tube 6(9) does not affect the tubes 13(12) to 20(12) as these tubes have already switched off by virtue of the short time constant of the pulse coupling C81 and R81. The anode of tube 6(9) is also pulse coupled via lead F1 to the suppressor grid networks of tubes 1(10), 3(10), 5(10) and 7(10) in such a manner that the said negative pulse is sufficient to switch off these tubes and so release those counter-triggers which were previously in an operated condition after counting the first dialled-in digit. The counter is therefore now in a position to count the impulses in the second dialled-in digit. Simultaneously with tube 6(9) switching on, tube 7(9) switches off and the positve pulse thereby generated on lead IS causes the counter-trigger 1 and 2(12) to operate, thereby raising the potential of the control grid of tube 14(12) to earth potential and rendering that of tube 13(12) sufficiently negative to prevent further switching of the tube by the suppressor grid, in accordance with the reasons given above.

The anode of tube 14(12) is pulse-coupled over lead ID2 to the control grid networks of store No. 2 in identical fashion to the connections between tube 13(12) and store No. 1.

At the end of the inter-train pause of approximately 300 ms. referred to above, the second dialled digit namely 5 will begin to arrive. The five impulses will, as explained in the foregoing for digit 4, be counted on the counter-triggers 1 to 8(10) and offered to all the eight stores in the form of a distribution of potentials on leads IC1–8 and in accordance with Table 4. Thus for the digit 5 it will be seen that counter-trigger 1 and 2(10) is operated, 3 and 4(10) released, 5 and 6 (10) operated and 7 and 8(10) released. Approximately 100 ms. after the arrival of the fifth impulse of this train the pulse trigger 6 and 7(9) is operated as explained with reference to the first dailled digit. Once again the positive pulse on lead F1 Fig. 9 momentarily raises the potential on the suppressor grids of tubes 13(12) to 20(12). On this occasion, only tube 14(12) will draw anode current, and, of the eight stores to which the digit 5 is offered, only store No. 2, Fig. 13, will accept it. About 50 ms. later the pulse trigger 6 and 7(9) will release and, as described for the first digit, release the counter-triggers 1 to 8(10) and pulse the counter driving tube 12(12). Said pulse will release counter-trigger 1 and 2(12) and operate 3 and 4(12), thereby raising the control grid of valve 15(12) to earth potential and reducing that of tube 14(12) to a potential sufficiently negative to prevent further switching of the tube by the suppressor grid.

The anode of tube 15(12) is pulse-connected to the control grid networks of store No. 3 and in similar fashion are the anodes of tubes 16(12), 17(12), 18(12), 19(12) and 20(12) connected to stores Nos. 4, 5, 6, 7 and 8. It will now be clear that in the same way as the first digit was counted and stored on store No. 1 and the second counted and stored on store No. 2 so will the subsequent digits be counted and stored sequentially on stores No. 3, 4, 5, 6, 7 and 8. In the case considered, the digits 4523376, only the stores 1-7 inclusive will be utilised. Such a call is defined above as a local call. It was also there stated that a class of calls, namely trunk calls, may be handled by the register. These calls may involve the storage of a number of digits greater than eight. When the counter comprising counter-triggers 1 and 2(12), 3 and 4(12) and 5 and 6(12) is stepped by the eighth operation of pulse trigger 6 and 7(12) it is, in effect, released, or returned to position 1 again. A ninth dialled digit is therefore stored on store No. 1. The digit previously stored on store No. 1 is destroyed when the lead ID1 is driven negative by the switching on of tube 13(12) and replaced by the ninth digit when the tube 13(12) is switched off. The timing of the functions performed by the register is such that by the time a ninth digit is dialled in, the first digit is no longer required to be held in storage. Similarly, a tenth digit is stored on store No. 2, an eleventh on store No. 3, and so forth.

STORES OUTPUTS (FIGS. 11–17, RIGHT)

The foregoing paragraphs have demonstrated the way in which the invention receives and stores the code and the numerical portions of the succession of digits comprising the wanted subscriber's number. Since the counter-triggers 1 to 8(12) are released as described later by a suitable negative pulse on lead RST Fig. 12 when the register is released after handling each call, the first digit of each call will always be stored on store No. 1, the second digit on store No. 2, etc. Consequently the code digits will always be stored on store No. 1, stores 1 and 2 or stores 1, 2 and 3, depending on the numbers of digits comprising the code. The numerical indication of the digits stored is defined by the distribution of potentials on the anodes of tubes 1 to 8(11), as described above, and may be ascertained by testing the potentials on leads A1–A4 Fig. 11 in the case of store No. 1, leads B1–B4 Fig. 13 for store No. 2 and leads C1–C4 Fig. 14 for store No. 3. When tube 1(11) is off the potential lead A1 will be near the + potential and, when tube 1(11) is on will be near earth potential. Similarly will the potentials on leads A2–A4, B1–B4, and C1–C4 be related to the switched condition of the tubes, to the anodes of which said leads are connected. If ↑ indicates the potential on one of said leads when its associated valve is "off" and ↓ then when its associated valve is "on" the following table gives the relationship between the digit number stored and the distribution of potentials on leads A1–A4, B1–B4 or C1–C4.

Table 5

| Digit Stored | Potential on lead A, B or C | | | |
|---|---|---|---|---|
| | 1 | 2 | 3 | 4 |
| Released | ↑ | ↑ | ↑ | ↑ |
| 1 | ↓ | ↑ | ↑ | ↑ |
| 2 | ↑ | ↓ | ↑ | ↑ |
| 3 | ↓ | ↓ | ↑ | ↑ |
| 4 | ↑ | ↑ | ↓ | ↑ |
| 5 | ↓ | ↑ | ↓ | ↑ |
| 6 | ↑ | ↓ | ↓ | ↑ |
| 7 | ↓ | ↓ | ↓ | ↑ |
| 8 | ↑ | ↑ | ↑ | ↓ |
| 9 | ↓ | ↑ | ↑ | ↓ |
| 0 | ↑ | ↓ | ↑ | ↓ |

Referring again to the dialled-in number 4523376 it will now be clear that when the code has been stored the leads A1–4, B1–4, C1–4 will possess the distribution:

A1=↑   A2=↑   A3=↓   A4=↑
B1=↓   B2=↑   B3=↓   B4=↑
C1=↑   C2=↓   C3=↑   C4=↑

It may therefore be said that the register indicates over the leads A1–4, B1–4, C1–4, the code for which the appropriate translation is required.

It has been shown how, as the disc in the memory rotates, all the information recorded in tracks 2–16 is serially, cyclically and continuously emitted over the common leads TA1–4, TB1–4, TC1–4 and TD1–3. It has also been shown how the presence of a hole under the photo cell associated with any of these leads causes said lead to assume a potential near earth, and the absence of a hole causes said lead to assume a potential near the + potential. Consideration of Fig. 3 together with Table 3 shows that when the sector of the disc in which is recorded the code G L A is being scanned the leads TA1–4, TB1–4 and TC1–4 will indicate, using the convention described as in the preceding paragraph, the potentials:

TA1=↑   TA2=↑   TA3=↓   TA4=↑
TB1=↓   TB2=↑   TB3=↓   TB4=↑
TC1=↑   TC2=↓   TC3=↑   TC4=↑

This distribution is identical with that on leads A1–4, B1–4, C1–4 as already shown.

STORES AND MEMORY OUTPUTS COMPARER (FIG. 18)

Figure 18:
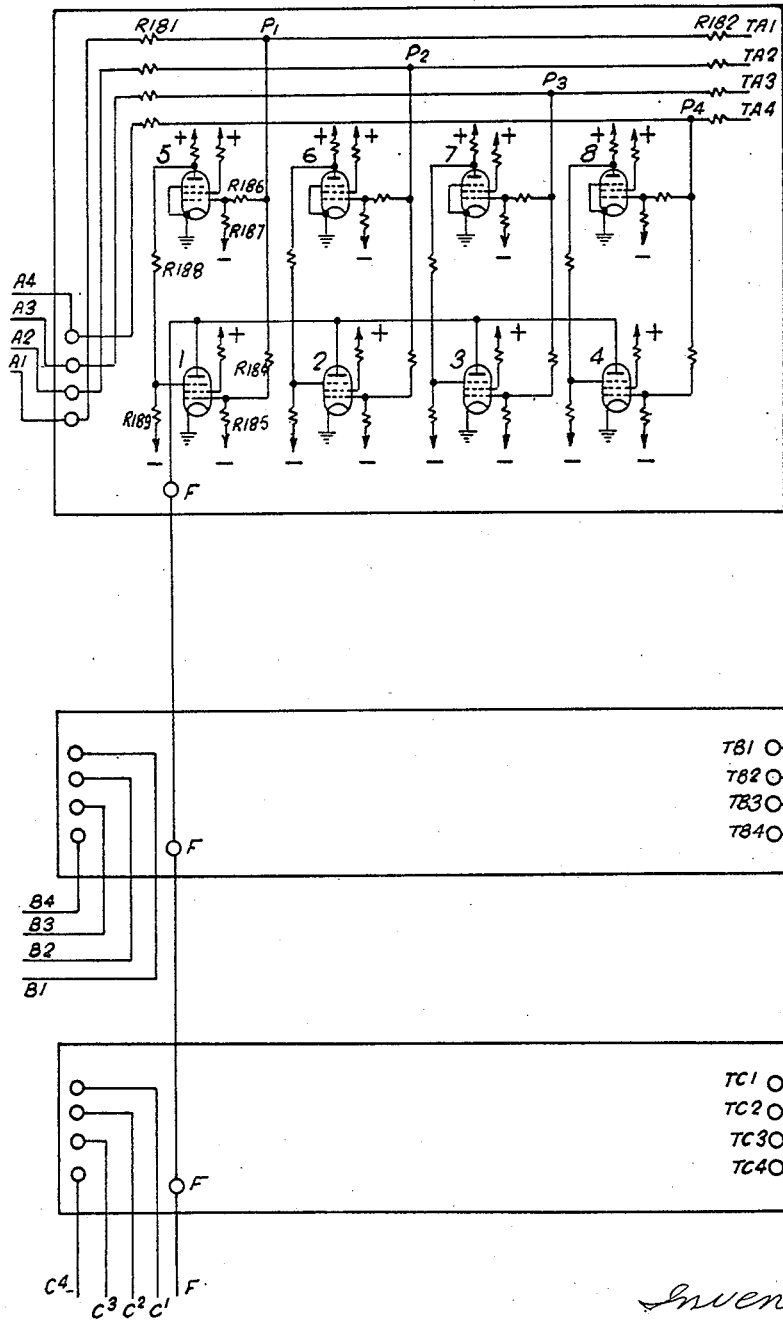

Referring now to Fig. 18 which shows a circuit designed to detect coincidence between the potential distributions of leads A1–4, B1–4, C1–4 on the one hand and TA1–4, TB1–4, TC1–4 respectively on the other. Thus if when the potentials of leads A1 and TA1 are coincident in the sense of Table 5 of the foregoing description and assuming R181 equal to R182, ↑ is the higher potential on any of these leads and ↓ is the lower, then the point P1 will have a potential ↑ or ↓. When, however, the potentials of leads A1 and TA1 are not coincident in the sense mentioned the point P1 will attain a potential approximately half way between ↑ and ↓, and which may be designated $\pm$. Consider first the point P1 is at the potential ↓. The potentiometer comprising resistors R184, R185 is so chosen that the tube 1(18) is switched off at its control grid. Considering the potential at P1 to be ↑, the potentiometer comprising resistors R186, R187 is so chosen that tube 5(18) is switched on and so switches off tube 1(18) at its suppressor grid via the D. C. coupling R188, R189. The potentiometers comprising resistors R186 and R187, and R184, R185 are also proportioned so that when the potential at point P1 is $\pm$, tube 1(18) is switched on at its control grid and tube 5(18) off at its control grid, hence tube 1(18) is switched on at both control and suppressor grids and provides a conducting path between lead F and the cathode which is connected to earth. The connections between leads A2 and TA2, A3 and TA3, A4 and TA4 and tubes 2 and 6(18), 3 and 7(18) and 4 and 8(18) are similar to those described for leads A1 and TA1 and the tubes 1 and 5(18). The anodes of tubes 1(18), 2(18), 3(18) and 4(18) are connected together and to lead F. Thus only when coincidence occurs simultaneously between A1 and TA1, A2 and TA2, A3 and TA3, A4 and TA4, making the potentials at points P1, P2, P3 and P4 either ↑ or ↓ is the lead F disconnected from earth potential. For conditions other than coincidence one or more of the tubes 1(18), 2(18), 3(18), 4(18) will be on, thereby connecting lead F to earth via the on tube. The circuit, not shown in detail, between leads B1–4 and leads TB1–4 is identical with that described above as is that between C1–4 and TC1–4. The lead F is common to the three circuits, and will be disconnected from earth only when the potential distributions on the twelve leads A1–4, B1–4, C1–4 are coincident with those of the twelve leads TA1–4, TB1–4, and TC1–4. Lead F is subject to further control which will be described later.

TRANSLATION DIGIT NUMBER DESIGNATOR AND COMPARER (FIG. 22)

Figure 22:
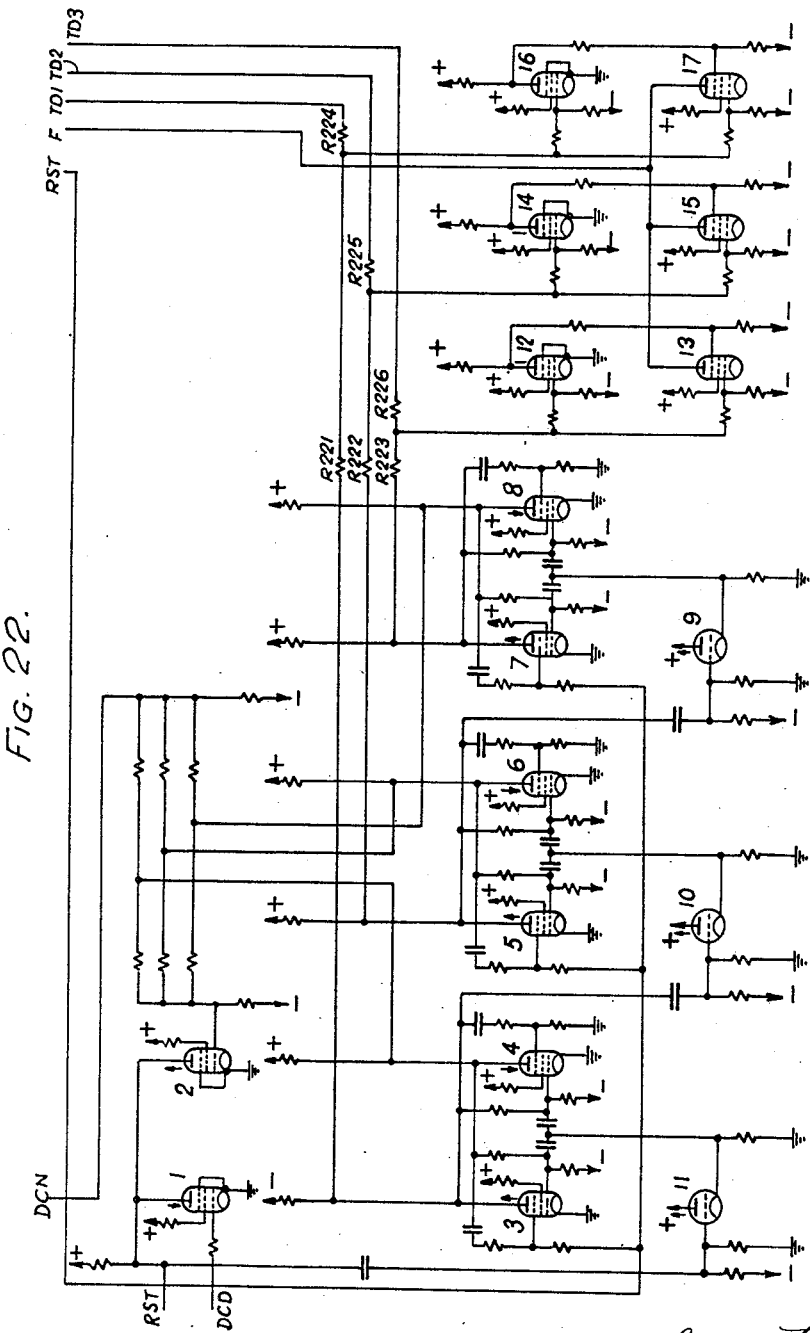

Referring now to Fig. 22, tubes 3(22) to 8(22) comprise a counter of the kind already described which is stepped once each time a digt is transmitted by the transmitter part of the register. The counter is released when the register is released and so immediately prior to transmission of the first digit of the translation the said counter is in a released condition. Tubes 3(22), 5(22) and 7(22) will therefore all be off, the potentials at the anodes being ↑. It is shown above (Fig. 3 and Table 3) how in the radial strip allocated to the first digt of each translation the tracks 2, 3 and 4 contain no holes. Consequently the leads TD1, 2 and 3, Fig. 5 will at the instant said radial strip is being scanned be at the ↑ potential. Returning now to Fig. 22, the anodes of tubes 3(22), 5(22) and 7(22) are connected to the leads TD1, 2 and 3 respectively via pairs of resistors R221 and R224, R222 and R225, R223 and R226; the junction of each pair of resistors is D. C. connected to tubes 16(22) and 17(22), 14(22) and 15(22), 12(22) and 13(22) respectively in such a manner that when the potentials on the anodes of tubes 3(22), 5(22) and 7(22) are coincident with those on leads TD1, 2 and 3 the tubes 13(22), 15(22) and 17(22) are switched off. For conditions other than coincidence one or more of tubes 3(22), 5(22) and 7(22) will be on. The operation of this circuit is similar to that described fully with reference to Fig. 18. The anodes of tubes 13(22), 15(22) and 17(22) are commoned and connected to lead F.

TRANSLATION DIGIT FORWARDER (FIG. 23)

Figure 23:
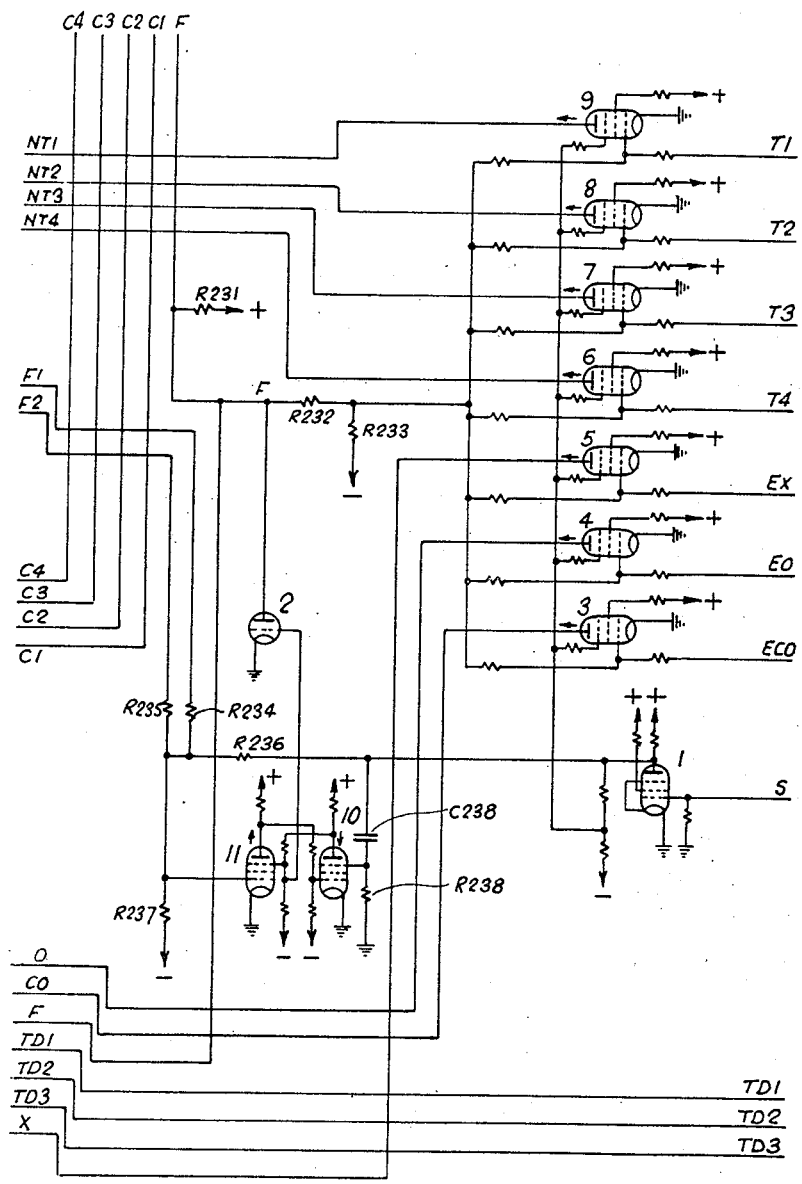

Referring now to Fig. 23 it will be seen that lead F is connected via R231 to the + potential and to the anode of tube 2(23). When the tubes 2(23), 1(18), 2(18), 3(18), 4(18) and the corresponding tubes in the circuit between leads B1–4 and TB1–4 and those in the circuit between leads C1–4 and TC1–4 and tubes 13(22), 15(22) and 17(22) are all simultaneously off the potential on lead F will rise to near + potential. When, however, any one or more of the said sixteen tubes is on, lead F will assume a potential near that of earth. The potentiometer comprising resistors R232, R233 is so chosen that when lead F is on the near earth potential the tubes 3(23) to 9(23) are switched off on the control grids irrespective of the potentials fluctuating on leads T1, 2, 3 and 4, EX, EO and ECO as the disc rotates. But when lead F is at the near + potential the said control grids are raised to a potential such that the tubes 3(23) to 9(23) will be switched by the potentials on leads T1–ECO.

Assuming for the moment that tube 2(23) is switched off, the lead F will attain the near + potential only when the first digit of the required translation is being scanned by the photo-cells associated with leads T1–4; that is when the first, second and third digits of the dialled in code are respectively coincident with the first, second and third digits recorded in tracks 5–16 on the disc and the absence of holes in tracks, 2, 3 and 4 coincides with the released condition of the counter in Fig. 22. During the short period that the first digit of the required translation is being scanned the tubes 9(23) to 6(23) will respond at the control grids to the potentials on leads T1–4. According to the information shown in Fig. 3 and the explanatory Table 3 the translation of the dialled-in code 452 is 847635, of which the first digit, 8, will be recorded in the form of a hole in track 20 and no hole in tracks 17, 18 and 19. Consequently when the lead F attains the near + potential the tube 6(23) will be switched on at the control grid, tubes 7(23), 8(23) and 9(23) remaining off. Reference was made above to the short pulses produced by the photo-cell 27(6) associated with track 1 each time a radial strip of information was being centrally scanned. These pulses result in tube 1(23) being switched off for the short duration thereof. Tube 1(23) is de-coupled to the suppressor grids of tubes 3(23) to 9(23) so that when tube 1(23) is off the said suppressor grids are at substantially earth potential and when tube 1(23) is on are reduced to a potential sufficient to switch off said tubes. Therefore when the hole in track 20, mentioned above, is centrally under the photo-cell associated with lead T4 the tube 6(23) will be momentarily switched on at both control and suppressor grids and a conducting path established between the anode of said tube and its cathode which is connected to earth.

As will be described in more detail later, the switching on of tube 6(23), combined with the fact that tubes 7(23), 8(23) and 9(23) remain off, results in the transmitter portion of the register transmitting the digit 8.

In the preceding paragraphs it was assumed that tube 2(23) is off. The purposes of tubes 2(23), 10(23) and 11(23) will now be described. Referring to Fig. 23, tubes 10(23) and 11(23) constitute a trigger, the released state of which is tube 11(23) off and tube 10(23) on. A connection between this trigger and the control grid of tube 2(23) ensures that when the trigger is released tube 2(23) is off and when the trigger is operated tube 2(23) is on. The foregoing paragraphs have made it clear that when tube 2(23) is on the tubes 3(23) to 9(23) cannot switch on and the translation digit cannot be signalled over the leads NT1–4 to the transmitter. If tube 2(23) is switched off, the translation digit will, when the radial strip in which it is recorded is scanned, be signalled to the transmitter. The leads F1 and F2 are independent control leads provided so that when either lead is at the near + potential, tube 2(23) may be switched on, and when both are at near earth potential tube 2(23) may not be switched on. The control exercised by the potentials on leads F1 and F2 is interlocked with the positive pulses on the anode of tube 1(23) in such a way that the tube 2(23) can only be switched during the period between positive pulses at the anode of tube 1(23). This interlocking action is as follows.

Leads F1, F2, the anode of tube 1(23) and the source of − potential are connected to the control grid of tube 11(23) via resistances R234, R235, R236 and R237 respectively. The magnitudes of said resistances are such that when one or more of the connections F1, F2 and the anode of tube 1(23) is at near + potential then tube 11(23) will be switched on at the control grid. The anode of tube 1(23) is pulse coupled to the suppressor grid of valve 10(23) via condenser C238 and resistance R238. The time constant of the combination C238 and R238 is short compared with the duration of the positive pulses appearing at the anode of tube 1(23), so that when tube 1(23) is switched off the suppressor grid of tube 10(23) is pulsed momentarily positive with respect to earth sufficient to switch on valve 10(23). Assume leads F1 and F2 to be at the near earth potential, then tube 11(23) will be switched off at the control grid. Hence the trigger 10 and 11(23) will be in a released state during the period of the positive pulses at the anode of valve 1(23), and since tube 2(23) is switched off whilst trigger 10 and 11(23) is released, the lead F will be permitted to attain the near + potential when the first digit of the translation is being scanned. Tubes 6(23) to 9(23) will therefore be switched on and the digit signalled as described above. At the end of each positive pulse on the anode of tube 1(23), valve 10(23) is switched off momentarily in an attempt to operate the trigger 10 and 11(23). This switches tube 2(23) on momentarily, but this is of no consequence. So long as leads F1 and F2 remain at near earth potential the trigger 10 and 11(23) will remain released, but when either of said leads attains the near + potential the trigger 10 and 11(23) will be operated at the end of the next positive pulse on the anode of tube 1(23). This will hold lead F at near earth potential until such time as the said lead, F1 or F2, is returned to the near earth potential. The purpose of the connection, via resistance R236, between the anode of tube 1(23) and the control grid of valve 11(23) is to prevent the trigger 10 and 11(23) being released by a near earth potential on lead F1 or F2 during the period of a positive pulse on the anode of tube 1(23).

Leads F1 and F2 control, in the manner described, the emission of the digits comprising the translation. Lead F1 is connected to the anode of tube 6(9), and it has been already explained how tube 6(9) is switched off for periods of approximately 50 milliseconds during which dialled-in digits are being stored. The reason for this is that due to the differences in the characteristics of commercial tubes there is a possibility that the anodes of the tubes constituting a store may, during the decay of the negative pulse, mentioned above, assume a distribution of potentials other than that to which the said anodes should settle down at the end of the said negative pulse. There is thus a remote possibility of false coincidence being established between the potentials on the anodes of the tubes constituting the first three stores and those on the leads TA1-4, TB1-4, TC1-4, Fig. 18. Were the lead F Fig. 23 permitted to attain the near + potential for such a false coincidence, a false digit would be signalled over leads NT1-4 and subsequently transmitted. In order to obviate such a possibility the emission of digits is suppressed by lead F1 which attains near + potential for about 50 ms. during which time the stores are undergoing a change of state. Since when the lead F1 is raised to near + potential the trigger 10 and 11(23) will not be operated immediately but will be operated at the end of the next positive pulse at the anode of tube 1(23) it is necessary to ensure that the tubes 1, 3, 5 and 7 of the store about to receive a dialled-in digit remain switched off by the negative pulse on the appropriate lead ID1-8 for a period not less than the time interval between successive positive pulses on the anode of tube 1(23). This condition is met by suitably choosing the values of condenser C81 and resistors R81 and R82.

Lead F2, connected to the transmitter in a manner described in detail in later paragraphs, is, prior to transmission of the first translation digit, held at the near earth potential. Consequently the first translation digit will be signalled the first time the correct radial strip of the disc is scanned after the lead F1 returns to near earth potential. For reasons described in detail later, the lead F2 is raised to near + potential immediately after the first translation digit has been signalled over leads NT1-4, thereby preventing further signalling over leads NT1-4.

DIGIT SENDER (FIG. 27)

Figure 27:
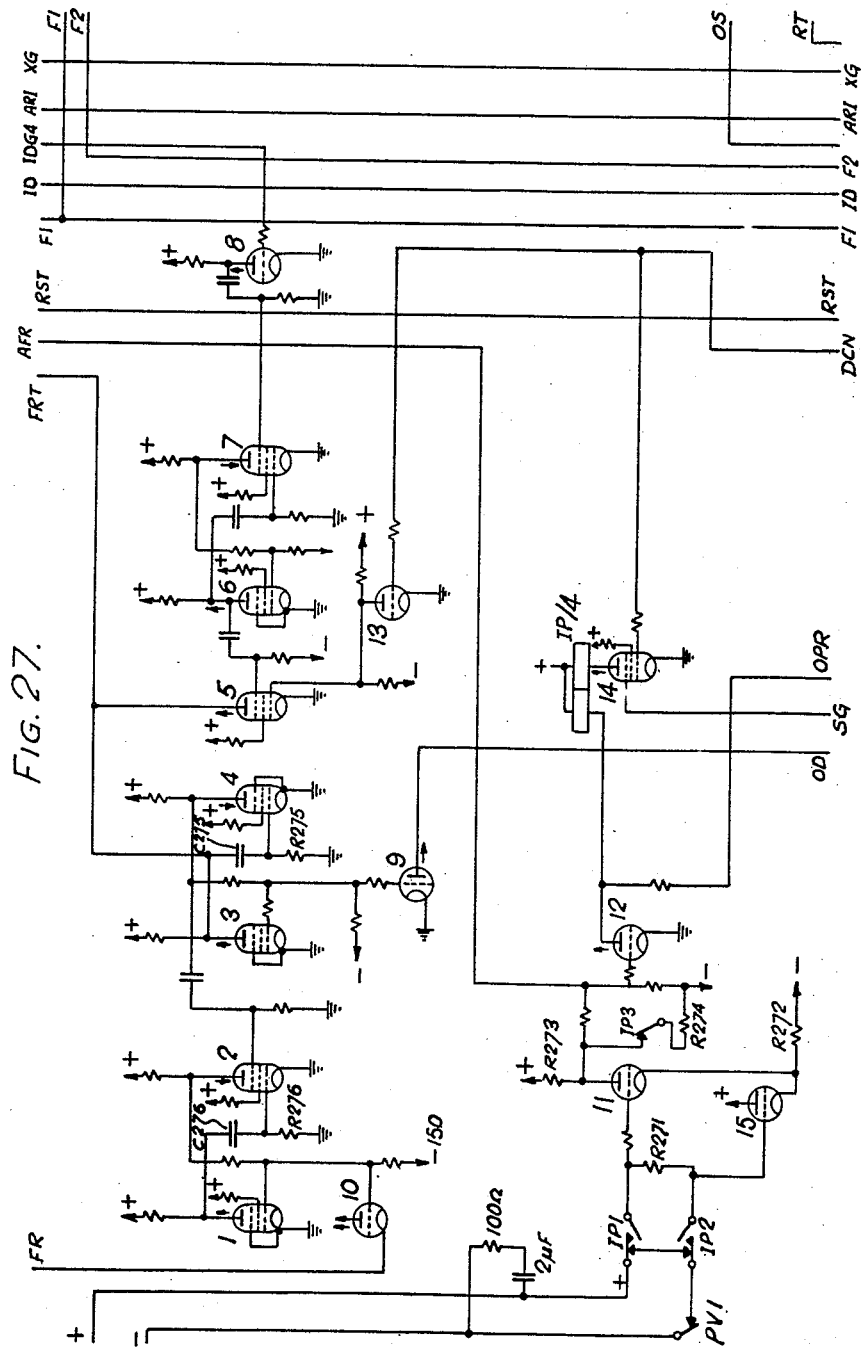

The first digit of the translation 847635, namely 8, will now be sent out from the register in the form of eight openings of the contacts PV1 Fig. 27 which bridge the leads + and —. The contacts will open for about 66 ms. and the openings will be spaced about 33 ms. apart. After the eighth opening has ended, a pulse trigger in the transmitter measures out an inter-train period of duration determined by conditions existing in the associated telephone network and which for purposes of description will be assumed to be approximately 1 sec. At the beginning of this period, the counter comprising tubes 3 to 8(22) which was referred to above is stepped one place. This results in the potential on the anode of tube 3(22) reducing to near earth potential, whilst those on the anodes 5(22) and 7(22) remain at near + potential. Coincidence with the potentials on the leads TD1, 2 and 3 will therefore require that TD1 be at near earth while TD2 and 3 be at near + potential. Reference to Fig. 3 shows that of those radial strips which contain the code 4 5 2 only the second has a hole in track 2 and no holes in tracks 3 and 4. At the end of the aforesaid inter-train period of about 1 second, lead F2 is reduced to near earth potential. The next time the radial strip containing a hole in track 2 and no holes in tracks 3 and 4, and the code GLA (i. e. 4 5 2) in tracks 5-16, is scanned the translation digit contained in tracks 17-20 of that radial strip, namely the second digit of the translation, will be signalled to the transmitter by momentarily switching on valve 7(23).

As in the case of the first translation digit, signalling the second translation digit to the transmitter results in lead F2 rising to near + potential and suppressing further signalling. The second translation digit will then be transmitted in the form of four openings of contacts PV1 in Fig. 27 and will be followed by another inter-train period. At the beginning of the said period the counter comprising valves 3(22) to 8(22), will be stepped again, thereby ensuring that coincidence can only occur on leads TD1, 2 and 3 when the third translation digit is being scanned. At the end of said period lead F2 is reduced to near earth potential and, when the appropriate radial strip is scanned, the third translation digit, namely 7, will be signalled over leads NT1-4 by momentarily switching on tubes 7(23), 8(23), and 9(23). Similarly the remaining digits, 6 3 5 will be signalled and transmitted in sequence.

When the last digit of the translation is signalled to the transmitter, namely digit 5, a hole in track 22 momentarily switches on tube 4(23) and over lead O so prepares the transmitter that when the digit 5 has been transmitted it will be followed in sequence by the so-called numerical digits which are stored on stores Nos. 4, 5, 6 and 7. When the fourth and last of the numerical digits has been transmitted, the register releases the connection to the first code selector and becomes available to other first code selectors in the customary manner. The method by which release is obtained will be described in later paragraphs.

Apart from the details of operation of the transmitter and the processes of release, the foregoing paragraphs have described the progress of the local call GLA 3376 through the circuits of the register and the way in which the translation of the code GLA is extracted from the memory. Before proceeding to a description of the transmitter it is opportune to refer to the progress of, firstly, a trunk call and secondly a service call.

TRUNK CALL REGISTERING AND SENDING

Let it be assumed that a calling subscriber wishes to make a trunk call. He will be required to dial firstly, the three digit local code which may be the letters T R U, corresponding to the digits 8 7 8; secondly, the required trunk code, which may be of varying number of digits but is here assumed to be the number 1234; thirdly the wanted subscriber's number which again may be of varying number of digits but is here assumed to be the number 12345. The subscriber will, after raising his receiver, be connected to a register-transmitter in the same way as described above. When he dials the wanted number, 878 1234 12345 the digits 8, 7 and 8 will be stored respectively on stores No. 1, 2 and 3, in similar manner to the storing of any local code and as described for the particular local code GLA in preceding paragraphs. When the third digit 8 has been stored and after the aforementioned lead F1 has reduced to near earth potential, coincidence on the leads A1–4 and TA1–4 etc. will occur simultaneously only when the translation digit 4 is being scanned. This may be seen by reference to Fig. 3 and explanatory Table 3 when the code T R U together with the translation 48 is shown recorded on the disc. Consequently the digit 4 will be signalled to the transmitter and after the inter-train period following the transmission of digit 4 the digit 8 will similarly be signalled to the transmitter. When the last digit of the translation, namely, 8 is signalled to the transmitter, a hole in track 22 momentarily switches on valve 4(23) and over lead O prepares the transmitter to commence transmitting the stored exchange and numerical digits, in this case these are 1234 and 12345, and at the same time a hole in track 21 momentarily switches on tube 5(23) and over lead X so modifies the conditions under which the register releases that the register will not disconnect from the first code selector until all the stored exchange and numerical digits have been transmitted.

SERVICE CALL REGISTERING AND SENDING

When a calling subscriber wishes to make a service call, for example, to refer to the speaking clock service, he is connected to a register-transmitter in the usual way after raising his receiver. He then dials the letters TIM. These are stored on stores No. 1, 2 and 3 and the translation is obtained and transmitted as for any other local code. The translation given by way of example in Fig. 3 and Table 3 is 5 9 2 2. The digits 5 9 2 2 will therefore be transmitted in sequence. It will be seen, however, in Fig. 3 that there is no hole in track 22 in the radial strip containing the last digit of the translation and that a fifth radial strip is allocated to the code although there is no fifth translational digit. After transmission of the fourth and last translation digit therefore, the leads A1–4 and TA1–4 etc. again obtain coincidence as the disc rotates but instead of a translation digit being signalled to the transmitter over leads NT1–4, a hole in track 23 momentarily switches on tube 3(23) and, over lead CO, causes the register to disconnect from the 1st code selector.

TRANSMITTING DIGITS

The operation of the transmitter will now be described. It comprises, inter alia, a binary register or store (Fig. 19) similar to that of Fig. 11, that receives, one by one, the digits to be transmitted; a transmitter relay operator (Fig. 27); a binary transmitted pulse counter (Fig. 20) and a comparer of the binary outputs of Figs. 19 and 20 (Fig. 21) similar to the comparer of Fig. 18. These elements will now be described.

TRANSMIT-DIGIT BINARY STORAGE (FIG. 19)

Figure 19:
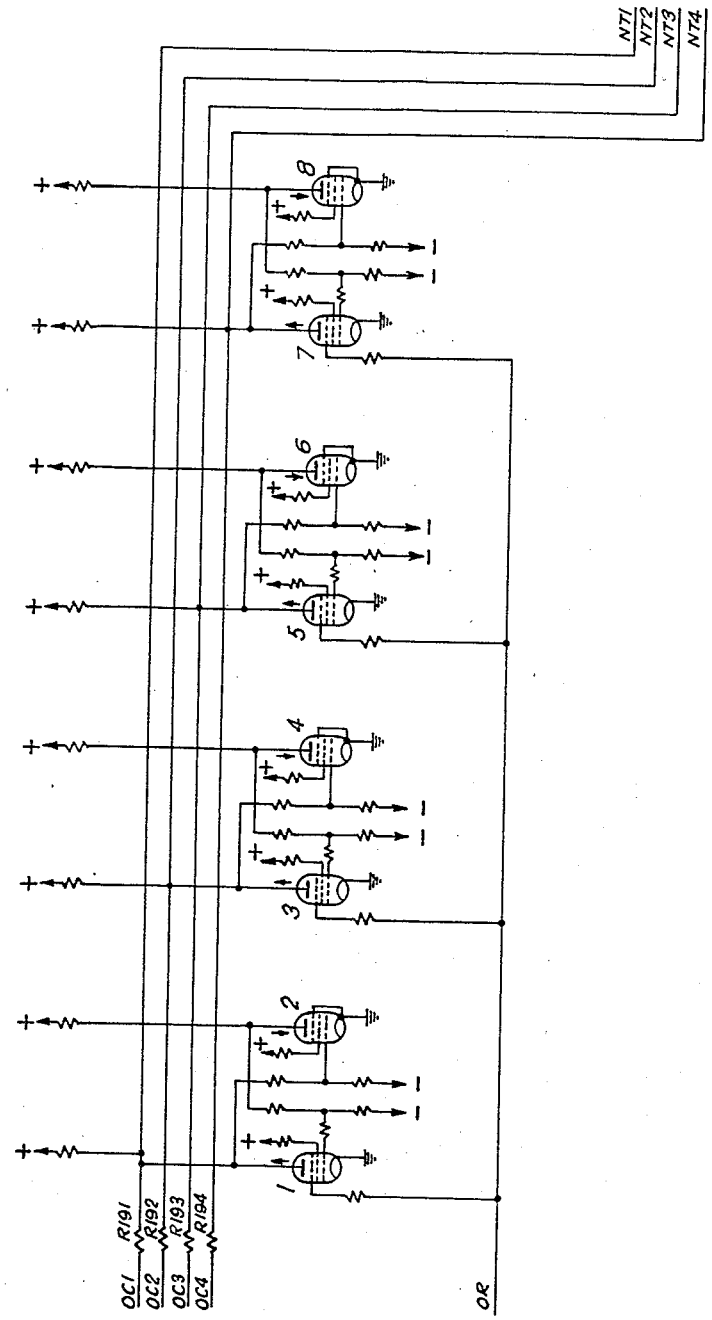

Referring to Fig. 19, the tubes 1 and 2(19), 3 and 4(19), 5 and 6(19) and 7 and 8(19) constitute four triggers, with cathodes connected to earth potential and anodes supplied from the + potential via suitable resistances. The suppressor grids of tubes 1(19), 3(19), 5(19) and 7(19) are connected via stopper resistances to lead OR and thence via a resistance (Fig. 26) to earth potential. It will be appreciated that if a negative pulse of sufficient magnitude is applied to lead OR the four triggers will assume a state in which tubes 1(19), 3(19), 5(19) and 7(19) are off and tubes 2(19), 4(19), 5(19) and 8(19) are on: the triggers are then said to be released. To the anodes of tubes 1(19), 3(19), 5(19) and 7(19) are connected respectively leads NT1, NT2, NT3 and NT4, which leads are mentioned in earlier paragraphs and which are connected to the anodes of tubes 9(23) to 6(23).

STORING TRANSLATION DIGIT

If now tube 9(23) is switched on the potential on the anodes of both tubes 9(23) and 1(19) will be reduced to near earth potential. This will switch off tube 2(19) and if valve 9(23) is now switched off again the trigger 1(19) and 2(19) will remain operated until such time as it is released by a negative going pulse on lead OR. Similarly the momentary switching on of tubes 8(23), 7(23) and 6(23) will cause the operation of triggers 3 and 4(19), 5 and 6(19) and 7 and 8(19) respectively. Thus it may be seen that when a translation digit is signalled by momentarily switching on a combination of the tubes 9(23) to 6(23), the said digit will be recorded by the ensuing operation of a combination of the triggers 1 and 2(19), 3 and 4(19), 5 and 6(19) and 7 and 8(19). Thus, for example, if the digit 8 is signalled by momentarily switching on tube 6(23) whilst tubes 9(23), 8(23) and 7(23) remain switched off, the trigger 7 and 8(19) will be operated whilst triggers 1 and 2(19), 3 and 4(19) and 5 and 6(19) remain released.

STORING NON-TRANSLATED DIGIT

Referring now to Fig. 11, the anodes of tubes 13(11), 12(11), 11(11) and 10(11) are connected respectively to the above mentioned leads NT1, 2, 3 and 4. The suppressor grids of said tubes are connected through resistances to the lead OD1, and via resistance R111 to a source of potential sufficiently negative to maintain tubes 13(11) to 10(11) switched off at the suppressor grids. The cathodes of said valves are connected to earth potential, and the control grids are so connected to the resistor networks on the control grids of tubes 1(11), 3(11), 5(11) and 7(11) that when trigger 1 and 2(11) is released tube 13(11) is switched off at the control grid and when trigger 1 and 2(11) is operated tube 13(11) is switched on at the control grid. Similarly when triggers 3 and 4(11), 5 and 6(11) and 7 and 8(11) released tubes 12(11), 11(11) and 10(11) are switched off at the control grids and when triggers are operated tubes 12(11), 11(11) and 10(11) are switched on at the control grids. If now store No. 1 were, for example, storing the digit eight, trigger 7 and 8(11) would be operated and triggers 1 and 2(11), 3 and 4(11) and 5 and 6(11) would be released. The application of a positive-going pulse to lead OD1, sufficient in magnitude to raise the suppressor grids of tubes 13(11), 12(11), 11(11) and 10(11) to substantially earth potential, will switch on tube 10(11) tubes 13(11), 12(11) and 11(11) remaining switched off. Consequently the trigger 7 and 8(19) will be operated whilst triggers 1 and 2(19), 3 and 4(19), and 5 and 6(19) remain released. The digit 8 will therefore be recorded on the said triggers just as was the digit described in the previous paragraph. The tubes 13(11), 12(11), 11(11) and 10(11) therefore constitute the means whereby a digit stored on store No. 1 may be signalled to the transmitter for transmission. Similar tubes are provided in each of the eight stores to enable the stored digit to be signalled to the transmitter when the appropriate lead OD1, OD2 etc. is momentarily raised to approximately earth potential.

TRANSMITTING RELAY OPERATOR (FIG. 26)

Figure 26:
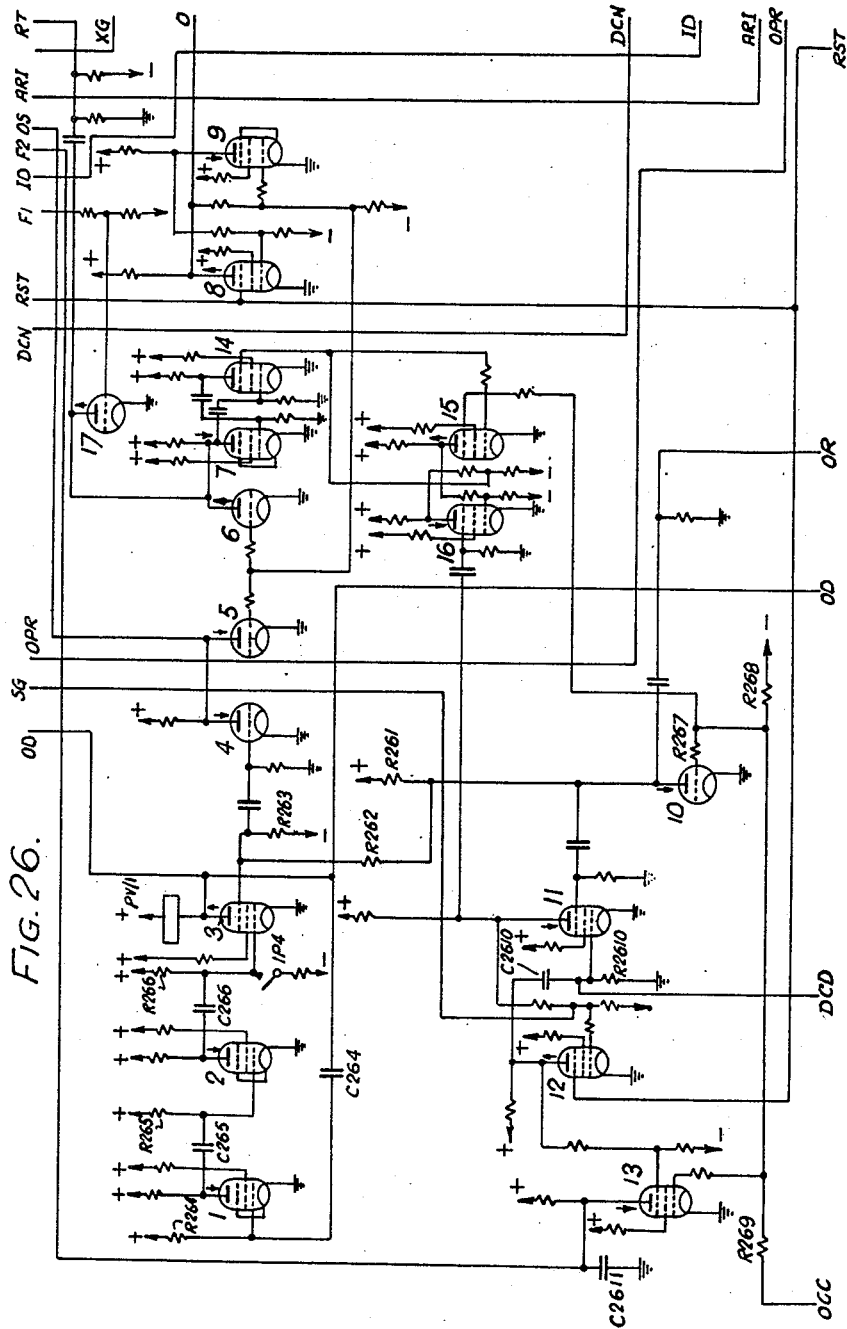

It will now be shown how when any combination of the triggers 1 and 2(19), 3 and 4(19), 5 and 6(19) and 7 and 8(19) is operated, the transmitter will transmit the digit corresponding to said combination. Reference was made above to the leads + and − on Fig. 7. Fig. 27 shows them to be looped via two change-over contact IP1 and IP2 and a contact marked PV1. It will be seen that operation of contact IP does not open the loop, but inserts the resistor R271. The purpose of these IP contacts will be described later. Opening of the contact PV1 however constitutes a break of the loop between leads + and −. Referring now to Fig. 26, relay PV/1, the operation of which opens the contacts PV, is connected between the + potential and the anode of tube 3(26). Tubes 1(26), 2(26) and 3(26) are connected together to form an oscillator of the multivibrator type which will be recognised by those skilled in the art. The suppressor grid of tube 3(26) is connected via resistance R263 to − potential and via resistances R262 and R261 to + potential. To the junction of R261 and R262 is connected the anode of tube 10(26), the cathode of which is earthed, and the values of resistances R261, 262 and 263 are such that when tube 10(26) is on, the potential at the suppressor grid of tube 3(26) is sufficiently negative with respect to earth to switch tube 3(26) off, and when tube 10(26) is off the said suppressor grid is raised to substantially earth potential. When, therefore, the tube 10(26) is on it is evident that tube 3(26) is off and tubes 1(26) and 2(26) are on. If tube 10(26) is switched off valve 3(26) switches on, operating relay PV/1 and so opening the loop + and − Fig. 27 at contacts PV1. When tube 3(26) switches on, valve 1(26) is switched off by virtue of the pulse coupling C264 and R264 between the anode of tube 3(26) and the control grid of valve 1(26). After a period of time determined in part by the values C264 and R264, and approximating closely to 33 milliseconds, the condenser C264 charges up to a potential sufficient to switch on tube 1(26), whereby valve 2(26) is switched off in similar manner to that described for tube 1(26). Since the resistances R264, R265 and R266 are also equal, tube 2(26) will remain off for approximately 33 ms. when it switches on again and so switches off tube 3(26). Similarly, after approximately 33 ms., tube 3(26) switches on again and tube 1(26) switches off. It is clear therefore that so long as the suppressor grid of tube 3(26) is held close to earth potential the tubes 1(26), 2(26) and 3(26) will oscillate, each tube being on for a period of approximately 66 ms. and off for a period of approximately 33 ms. Consequently relay PV/1 will operate for 66 ms. and release for 33 ms., and will generate in the loop + and − breaks of 66 ms. and makes of 33 ms.

The control grid of tube 10(26) is connected, via the grid current limiting resistor R267, to the junction of resistors R268 and R269. Resistor R268 is connected to − potential and R269 via lead OCC to resistor R211 Fig. 21. R211 is connected to the + potential. To the lead OCC are connected the anodes of tubes 2(21), 4(21), 6(21) and 8(21), the cathodes of which are earthed and the values of resistors R268, R269, R211 are so adjusted that when one or more of the tubes 2(21), 4(21), 6(21) and 8(21) is on, tube 10(26) is switched off, but when all said tubes are off tube 10(26) is switched on. A condenser C211 is connected between lead OCC and earth, the purpose of which will be explained later.

TRANSMITTED PULSE COUNTER (FIG. 20) AND COMPARER (FIG. 21)

Figure 20:
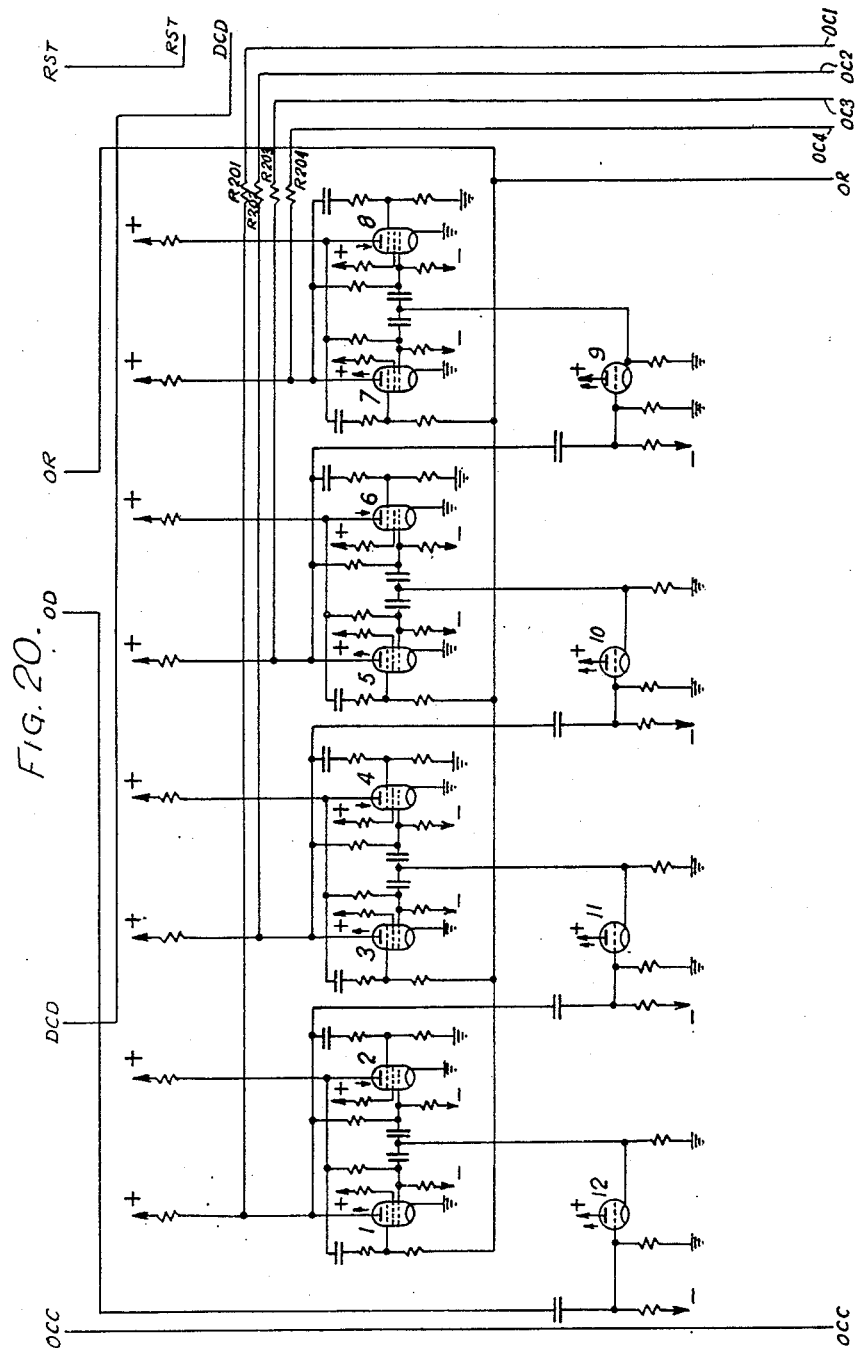
Figure 21:
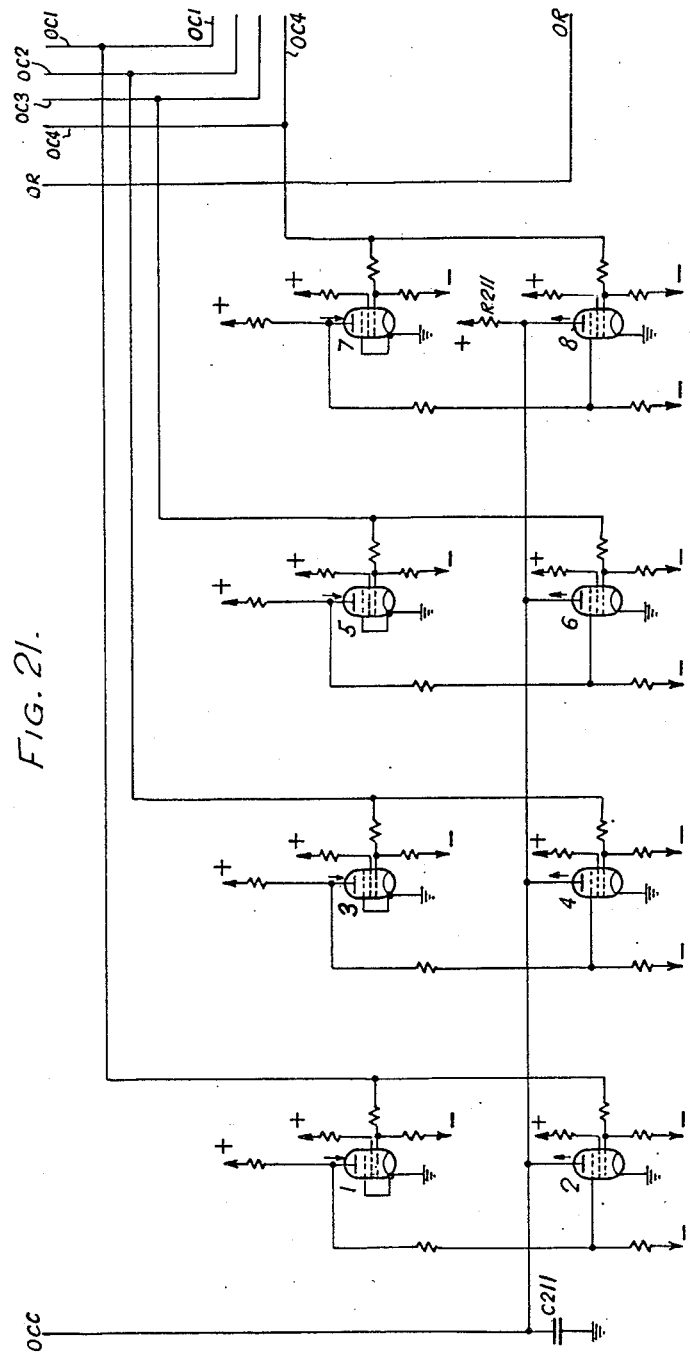

Referring now to Fig. 20, tubes 1(20) to 8(20) constitute four counter-triggers driven by the counter-driving valves 12(20) to 9(20). The suppressor grids of tubes 1(20), 3(20), 5(20) and 7(20) are connected via current limiting resistances to the lead OR and thence in Fig. 26 via a resistance to earth potential. If a negative pulse of sufficient magnitude to switch off tubes 1(20), 3(20), 5(20) and 7(20) is applied to lead OR the counter-trigger will assume the released state, namely, tubes 1(20), 3(20), 5(20) and 7(20) are off and tubes 2(20), 4(20), 6(20) and 8(20) are on. It is mentioned above that a suitable negative pulse on lead OR releases the triggers 1 and 2(19) and 3 and 4(19), 5 and 6(19) and 7 and 8(19) in which state tubes 1(19), 3(19), 5(19) and 7(19) are off. Now the lead OC1 connects the anode of tube 1(19) via resistances R191 to the anode of tube 1(20) via resistance R201. Similarly are the anodes of tubes 3(19), 5(19), and 7(19) connected to the anodes of tubes 3(20), 5(20) and 7(20) via resistances R192 and R202, R193 and R203, R194 and R204 respectively. The junctions of the resistances R191 and R201, R192 and R202, R193 and R203, R194 and R204, i. e. the leads OC1, 2, 3 and 4 are D. C. coupled to the control grids of tubes 1(21) and 2(21), 3(21) and 4(21), 5(21) and 6(21), 7(21) and 8(21) respectively. These latter tubes are inter-connected in a manner similar to the interconnection of tubes 1(18) to 8(18), and just as coincidence of potential distributions on leads A1–4 and TA1–4, permits lead F to assume a near + potential and absence of coincidence on said leads reduces the potential on lead F to near earth, so coincidence of the distribution of potentials on the anodes of tubes 1(19), 3(19), 5(19) and 7(19) with those on the anodes of tubes 1(20), 3(20), 5(20) and 7(20) will permit the lead OCC to assume a near + potential and absence of said coincidence will reduce the potential on lead OCC to near earth.

Thus it is apparent that after a suitable negative pulse has been applied to lead OR, a state of coincidence will exist between the counter-triggers of Fig. 20 and the triggers of Fig. 19. Thence the lead OCC will be at such a potential that the tube 10(26) is on, rendering tube 3(26) off and thereby preventing the oscillator tubes 1(26), 2(26) and 3(26) from pulsing relay PV/1. This is the normal condition of the circuit, that is, the condition in which the circuit stands before and after transmitting a train of impulses.

It has been stated above that the switching on of tube 6(23) combined with tubes 7(23), 8(23) and 9(23) remaining off, according to the example chosen, results in the transmission of digit 8, and it has also been shown that said switching on results in the operation of the trigger 7 and 8(19) whilst triggers 1 and 2(19), 3 and 4(19), 5 and 6(19), remain released. The operation of trigger 7 and 8(19) destroys the state of coincidence existing between the triggers in Fig 19 and the counter-triggers in Fig. 20. Consequently the potential on lead OCC will fall to near earth and so switch off tube 10(26) thereby operating relay PV/1 and permitting the oscillator tubes 1(26), 2(26) and 3(26) to function as described above. When tube 3(26) has been on for approximately 33 ms. it will switch off, releasing relay PV/1, and communicating over lead OD a positive-going pulse to the control grid of counter-driving tube 12(20). This pulse will operate counter-trigger 1 and 2(20). Approximately 100 ms. later tube 3(26) will switch off again and the resulting positive-going pulse over lead OD releases counter-trigger 1 and 2(20) and operates counter-trigger 3 and 4(20). Thus after each opening of the loop + and — the counter-triggers in Fig. 20 are stepped one place. Consideration of the distributions of potentials occurring at the anodes of the said counter-triggers as each impulse is counted, shows that the state of non-coincidence between the anodes of tubes 1(20), 3(20), 5(20) and 7(20) and those of tubes 1(19), 3(19), 5(19) and 7(19) is maintained until the eighth impulse is transmitted. Coincidence is then established and the potential on lead OCC rises to near + potential, switching tube 10(26) on and so preventing any further transmission.

When tube 10(26) switches on, the negative potential on the anode thereof is communicated over lead OR via suitable pulse coupling to the suppressor grids of tubes 1(20), 3(20), 5(20) and 7(20) and of valves 1(19), 3(19), 5(19) and 7(19) thereby releasing any operated triggers simultaneously. In this case the triggers 7 and 8(20) and 7 and 8(19) will be released. Consequently the state of coincidence is maintained and tube 10(26) remains on. The condenser C211 is connected between the lead OCC and earth and is of sufficient capacitance to prevent the potential on said lead falling sufficiently to switch on tube 10(26) should coincidence be momentarily destroyed during the release of above mentioned triggers.

INTERTRAIN SPACING

When tube 10(26) switches on, the negative potential on the anode thereof is also communicated by pulse-coupling to the suppressor grid of tube 11(26) which is on the tube of pulse-trigger 11 and 12(26). Said pulse trigger is thus operated and remains operated for a period determined in part by the magnitude of condenser C2610 and resistance R2610 and which constitutes the intertrain period required by the telephone system in which the register transmitter is connected and will be taken to be approximately 1 second for ease of circuit description. When the pulse trigger 11 and 12(26) operates, a negative pulse is communicated by lead DCD to the control grid of tube 1(22), the cathode of which is earthed and the anode of which generates a positive-going pulse thereby operating counter-trigger 3 and 4(22) by momentarily switching on driving tube 11(22) at the control grid.

TIMING ACCEPTANCE OF DIGITS

It has been described above how of the plurality of digits comprising the translation, the first digit is obtained by the detection of coincidence between the absence of holes in tracks, 2, 3 and 4 of the radial strip containing the said first digit and the released state of the three counter-triggers 3 and 4(22), 5 and 6(22), and 7 and 8(22). Now that the counter-trigger 3 and 4(22) has been operated coincidence between the potentials on the leads TD1, 2 and 3 and on the anodes of tubes 3(22), 5(22) and 7(22) will only occur when a radial strip with a hole in track 2 and no holes in tracks 3 and 4 is being scanned. Hence when the lead F2 is reduced to near earth potential, see above, the second digit of the translation will be signalled over leads NT1–4 and stored on the triggers shown in Fig. 19 for transmission.

The conditions under which the potential on lead F2 is changed will now be described. Fig. 26 shows the said lead connected to the anode tube 13(26) and, via a suitable resistance, to + potential. Tube 13(26) is, prior to the first digit being signalled over leads NT1–4, switched on because of the near + potential of lead OCC applied to the control grid of said tube and the released state of pulse trigger 11 and 12(26) holds the suppressor grid of said tube at substantially earth potential. Consequently lead F2 is at near earth potential. When the first digit is signalled and the destruction of coincidence between leads OC1–4, and the anodes of tube 1(20), 3(20), 5(20) and 7(20) causes lead OCC to assume a near earth potential, the tube 13(26) is switched off at the control grid and remains so switched until the said coincidence is restored by the transmission of the last impulse of the train constituting the first digit. This restoration of coincidence raises lead OCC to near + potential and so switches on tube 13(26) at the control grid. The said tube is, however, immediately switched off again at the suppressor grid by the operation of pulse-trigger 11 and 12(26) and the D. C. coupling between anode of 12(26) and suppressor grid of tube 13(26), and in fact the lead F2 remains substantially at near + potential because a condenser C2611 between said lead and earth is provided with sufficient capacitance to by-pass the momentary surge at the anode of tube 13(26) during said switching. The lead F2 will therefore remain at near + potential until the pulse trigger 11 and 12(26) releases, when tube 13(26) is switched on at the suppressor grid and the lead F2 assumes near earth potential.

The second digit of the translation will now be signalled when the radial strip in which it is recorded is scanned, and will appear as an operation of the appropriate combination of the triggers 1(19) to 8(19) as previously described for the first digit. The destruction of coincidence between potentials on leads OC1-4 and those on anodes of tubes 1(20), 3(20), 5(20) and 7(20) will result in the potential on lead F2 rising to near + potential and in transmission by relay PV/1 of the appropriate number of impulses. The impulses will be counted by the counter-triggers 1 to 8(20) until coincidence is restored and the pulse-trigger 11 and 12(20) is operated. Both the counter-triggers 1 to 8(20) and the triggers 1 to 8(19) will be released together thereby maintaining the said coincidence and the counter-triggers 3 to 8(22) stepped another place. Coincidence between the potentials on lead TD1, 2 and 3 and the anodes of tubes 3(22), 5(22) and 7(22) will now occur only when a radial strip with a hole in track 3 and no holes in tracks 2 and 4 is being scanned. Hence when the pulse-trigger 11 and 12(26) releases, and the disc rotates until the correct radial strip is being scanned, the third digit of the translation will appear as an operation of the appropriate combination of triggers 1 to 8(19). When the third digit has been transmitted and the inter-train period of pulse trigger 11 and 12(26) has elapsed the fourth digit will appear on the trigger 1 to 8(19) and so on, there being in fact no limit to the number of digits a translation may comprise except that in the particular example herein described the capacity of the counter-triggers 3 to 8(22) limits the said number to eight such digits.

It is described above how when pulse-trigger 11 and 12(26) operates, tube 1(22) is momentarily switched off and so, via driving tube 11(22), steps the counter-triggers 3 to 8(22). Referring now to Fig. 22, the anode of tube 1(22) is connected to the anode of tube 2(22) the cathode of which is earthed. The control grid of tube 2(22) is connected via a resistance to − potential and via further resistances, which are substantially equal in value, to the anodes of tubes 4(22), 6(22) and 8(22) and the magnitude of the said resistances is so chosen that only when all the tubes 4(22), 6(22) and 8(22) are off is the tube 2 switched on at the control grid. This only occurs when the counter has been stepped eight times and then tube 2(22) switches on and by holding the anode of tube 1(22) at near earth potential prevents further stepping of the counter-triggers 3 to 8(22) by the transmission of further digits. The said counter-triggers will therefore hold in the eighth position until released by a negative pulse on lead RST of sufficient magnitude to switch off tubes 3(22), 5(22) and 7(22). A somewhat similar resistance network to that described as connected to the control grid of tube 2(22) is provided connected to the lead DCN. The purpose of the lead DCN will be described later.

TRANSFER FROM REGISTER STORES

Mention is made above of how, when the last digit of the translation of a local code is signalled to the transmitter, tube 4(23) is momentarily switched on by the presence of a hole in track 22, and so prepares the transmitter that when the last digit has been transmitted, it will be followed by the numerical digits stored in stores Nos. 4, 5, 6 and 7. The method by which this is attained will now be described.

It is described above how the digit stored in any store may be signalled to the transmitter by the application of a suitable positive pulse as the appropriate lead OD1, 2 etc. These leads are pulse-coupled to the anodes of tubes 10(25) to 17(25). Referring now to Fig. 25, tubes 1(25) to 6(25) constitute three counter-triggers driven by counter-driving tubes 7(25) to 9(25). The counter-triggers 1(25) to 6(25) and the tubes 10(25) to 17(25) are interconnected in a similar manner to the counter-triggers 1(12) to 6(12) and the tubes 13(12) to 20(12) except in that whereas in the latter case the lead RST is pulse-coupled to the suppressor grids of tubes 1(12), 3(12) and 5(12) in the former it is connected to the suppressor grids of tubes 1(25), 4(25) and 5(25). Thus whereas when a suitable negative going pulse on lead RST releases the counter-triggers 1(12) to 6(12) the control grid of tube 13(12) is raised to substantially earth potential, when the said negative going pulse releases counter-triggers 1(25) to 6(25) the control grid of tube 13(25) is raised to substantially earth potential. The common suppressor grids of tubes 10(25) to 17(25) are connected to lead RT which is normally held at a potential sufficiently negative with respect to earth to switch off tubes 10(25) to 17(25) at the suppressor grids. If now lead RI is raised to substantially earth potential for a short period and then returned to its normal potential, tube 13(25) will be switched on and then switched off. The pulse coupling between the anode of tube 13(25) and the leads OD4 etc. is of sufficiently short time constant that when tube 13(25) switches on, lead OD4 communicates a negative going pulse to the suppressor grids of tubes 12(15) to 9(15) and when valve 13 switches off said lead communicates a positive going pulse to said suppressor grids. It is arranged that this positive going pulse is of sufficient magnitude to switch on any of tubes 12(15) to 9(15) which are already switched on at the control grids and thereby causes the digit stored in store No. 4 to be signalled to the transmitter as described above.

Referring now to Fig. 26, the circuit including tubes 7(26) and 14(26) constitutes a multi-vibrator, which, when oscillating, generates substantially rectangular voltage wave-forms at the anodes of said tubes. Said voltage will oscillate between the near earth and near + potentials. Oscillation may be prevented by switching on tube 6(26) the anode of which is connected to the anode of tube 7(26) while the cathode of tube 6(26) together with the cathodes of tubes 7(26) and 14(26) are connected to earth potential. Oscillation is also prevented when the trigger 15(26) and 16(26) is released by virtue of the D. C. coupling between the anode of the down tube 16(26) and the suppressor grid of tube 14(26).

At the conclusion of the inter-train period following the transmission of a digit, tube 11(26)

switches on, and, by virtue of the pulse coupling between the anode of tube 11(26) and the suppressor grid of tube 16(26), operates trigger 15 and 16(26). The multi-vibrator 7(26) and 14(26) does not however start oscillating until tube 6(26) has been switched off. The control grid of tube 6(26) is D. C. coupled to the trigger 8 and 9(26) such that when said trigger is operated tube 6(26) is off and when said trigger is released tube 6(26) is on. Said trigger is in a released condition until the last digit of the translation of a local code is signalled to the transmitter, when the momentary switching on of tube 4(23) operates said trigger via lead O and consequently switches off tube 6(26). When the last translation digit has been transmitted and the inter-train pause has expired, tube 11(26) switches on again, and, as above described permits the oscillator tubes 7(26) and 14(26) to function. It should be noted that tube 17(26) serves a purpose yet to be described and is for the present assumed to be switched off. The succession of rectangular voltages generated at the anode of tube 7(26) is therefore communicated via a pulse-coupling to lead RT. The said pulse-coupling is given a time-constant sufficiently short to produce on lead RT a differentiated version of the rectangular voltages at the anode of tube 7(26). The suppressors of tubes 10(25) to 17(25) are therefore subjected to a succession of positive and negative pulses of which the positive pulses are of sufficient magnitude to raise said suppressors to substantially earth potential, whereby, as described above, the digit stored in store No. 4 is signalled to the transmitter. When the triggers 1(19) to 8(19) assume the state of equilibrium appropriate to the first numerical digit to be transmitted the lead OCC reduces to near earth potential and switches off tube 15(26) at the suppressor grid, thereby releasing trigger 16 and 15(26) and stopping the oscillator 7 and 14(26).

The digit stored in store No. 4 is the first numerical digit, and will be transmitted by the impulsing of relay PV/1 in similar manner to that already described. Referring to Fig. 26, when the signal on lead O operates trigger 8 and 9(26) and so switches off tube 6(26), it also switches off tube 5(26). Tubes 4(26) and 5(26) have a common anode resistance, and as long as tube 5(26) is on, switching off tube 4(26) makes substantially no change in the potential on the anode of tube 5(26), to which is connected the lead OS. The control grid of tube 4(26) is pulse-coupled to the anode of tube 10(26). When tube 10(26) switches on after the last impulse of a digit has been transmitted, tube 4(26) is momentarily switched off. When tube 10(26) switches on after the last impulse of the last translation digit, i. e. when the local call end order in column 22 (Fig. 3) is reached, tube 5(26) is off and the switching off of tube 4(26) then causes a positive pulse to be generated on lead OS thereby stepping the counter-triggers 1 to 6(25) from the fourth to the fifth position.

When the counter-triggers 1 to 6(25) step to the fifth position, the tube 13(25) is switched off and tube 14(25) is switched on at the control grids. At the end of the inter-train period following the transmission of the first numerical digit therefore, the release of pulse-trigger 11 and 12(26) operates trigger 16 and 15(26) and starts up the oscillator 14(26) and 7(26) as before. Of the tubes 10(25) to 17(25) only tubes 14(25) will be momentarily switched on by the positive pulse on the common suppressor grids.

Consequently the digit stored on store No. 5 will be signalled over leads NT1–4 since the anode of tube 14(25) is connected with that store in similar fashion to the connection between the anode of store No. 4 and tube 13(25), described above.

It will be seen that when the second numerical digit has been transmitted, it will be followed by the third, which, in turn, will be followed by the fourth, in the same way as the second numerical digit is shown above to follow the first.

TIMING OF DIGIT SEEKING

One more feature of the circuit in Fig. 26 remains to be described. Tube 17(26) has its anode connected to the anode of tube 7(26) and its cathode earthed. The control grid of said tube is D. C. coupled to the lead F1. It has been described above how, by raising the potential of lead F1 to near + potential during the period of storing a dialled digit, the possibility of obtaining a fase translation whilst a store is settling down is obviated. It will be realised that if a calling subscriber delays dialling the numerical digits after dialing the code it is possible that the transmitter may seek the first numerical digit, by operating trigger 16 and 15(26), before store No. 4 has settled down. This possibility is prevented since by switching on tube 17(26) the near + potential on lead F1 prevents the starting up of the oscillator 7 and 14(26), until lead F1 returns to near earth potential, thereby switching off tube 17(26).

DISCONNECTING AFTER LOCAL CALLS

To complete the description of the progress of the local call through the register transmitter it remains to show how, when the fourth, and last, numerical digit has been transmitted, the register transmitter disconnects from the first code selector and so becomes available for use by another calling subscriber. It has been shown how, when a digit has been transmitted, the counter-triggers 1(25) to 6(25) are stepped on one place. Hence when the fourth and last numerical digit has been transmitted, the tube 16(25) will be switched off at the control grid and tube 17(25) will be switched on at the control grid. Simultaneously by virtue of the lead ODG8 valve 8(24) will be switched on at the control grid. The suppressor grid of tube 8(24) is, together with that of valve 10(8) D. C.-coupled to the trigger 10 and 11(24) so that when said trigger is released tubes 8(24) and 10(8) are switched on at the suppressor grids and when said trigger is operated said tubes are switched off thereat.

In the case of the local call being considered, the said trigger is in a released state, therefore tube 8(24) will switch on when the last numerical digit has been transmitted. The anode of tube 8(24) is pulse coupled to the suppressor grid of the tube 13(24) of the pulse trigger 13 and 12(24) and when tube 8(24) switches on pulse trigger 13 and 12(24) operates. The anode of tube 13(24) is D. C. coupled to the control grid of tube 20(24) so that when pulse trigger 13 and 12(24) is released tube 20(24) is off and when said trigger is operated said tube is on. The cathode of valve 20(24) is connected to the − potential and the anode by a suitable resistance to earth. To the anode is connected the lead RST which is also connected to the suppressor grids of all tubes in the register transmitter which require to be switched off in order to release the numerous triggers remaining operated at the conclusion of a call. Of these triggers some serve a purpose to be described later but all are listed here.

Counter-trigger tubes 15 and 13(8)
Pulse-trigger tube 12(26)
Trigger-tube 8(26)
Counter-trigger valves 3(22), 5(22) and 7(22)
Trigger-tube 11(24)
Trigger-tubes 1, 3, 5 and 7 in each of the eight stores in Figs. 11, 13, 14, 15, 16 and 17.

The lead RST is pulse-coupled to the suppressor grids of tubes 1(12), 3(12) 5(12) and 7(12) and of valves 1(25), 3(25) and 5(25).

Referring again to Fig. 24 the trigger 17(24) and 18(24) is provided with D. C. coupling between the anode of the off tube 17(24) and the suppressor grids of tubes 15(24) and 16(24), the cathodes of which are connected to earth, so that when said trigger is released said tubes are switched on at the suppressor grids and when said trigger is operated said tubes are switched off thereat. When the trigger 13 and 12(24) is operated as described in the foregoing, the tubes 15(24) and 16(24) are switched on by virtue of the D. C. coupling between the anode of tube 13(24) and the control grids of tubes 15(24) and 16(15). Relay CO/1, connected between the anode of tube 15 and the + potential is therefore operated and disconnects the P lead, see Fig. 8, from the source of —50 v. potential, thereby causing relay K/2 in the 1st code selector, to release. Hence relay KR/4 releases, the required speech connection is switched through to the calling subscriber in the well-known manner and the register-transmitter is disconnected from the 1st code selector at contacts KR1, 2, 3 and 4.

When the lead PU, Fig. 7, is disconnected at contacts ER1 the resulting break in the PU load simulates the dialling of the digit one and to prevent the mis-operation of the register connection, lead I. D. is provided between the anode of tube 3(9) and that of tube 16(24), which latter tube is, as described above, switched on whilst relay CO/1 is operated and so prevents the operation of pulse-trigger 3 and 4(9) by the said break in the PU lead.

Referring again to Fig. 24, relay CO/1 remains operated until after pulse-trigger 13 and 12(24) releases. The release lag of relay CO/1 is sufficient to ensure that the anode of tube 20(24) is returned to earth potential before the control grid circuit of tube 1(8) is again connected to the P lead at contacts CO1. When relay CO/1 releases, the register transmitter is therefore ready for immediate connection to another calling subscriber.

AFTER TRUNK CALLS

The progress of a trunk call through the register-transmitter is identical with that of a local call up to the stage when the last digit of the translation is signalled over leads NT1-4. When this occurs not only does a hole in track 22 of the rotating disc momentarily switch on tube 4(23), but in addition a hole in track 21 momentarily switches on tube 5(23). Consequently not only is the trigger 8 and 9(26) operated, thereby giving the transmitter access to the stored numerical digits but trigger 10 and 11(24) is operated. The anode of the up tube 11(24) of said trigger is D. C. coupled to the suppressor grid of tube 8(24), so that when said trigger is operated tube 8(24) is switched off. Hence when the counter-triggers 1 to 6(25) move to position 8 the register will not release as above described because tube 8(24) cannot be switched on at the control grid. A trunk call may consist of say twelve dialled digits, see above, or the number may be eleven or some other number. For economy of equipment in the particular design here described it is assumed that the translation will have been transmitted before the calling subscriber dials the ninth digit and that the digits stored on stores Nos. 1, 2 and 3 are therefore no longer required. The ninth dialled digit is therefore stored on store 1, the tenth on store 2, etc. as described above.

The transmitter commences transmitting the translation after the calling subscriber has dialled the third digit, and the counter-triggers 1 to 6(12) are stepped one place for each dialled digit. The counter-triggers 1 to 6(25) however, remain in position 4 until the whole of the translation has been transmitted. Consequently it will be seen that, unless the calling subscriber is excessively slow in dialling the wanted number, he will have completed dialling said number some time before the transmitter is ready to transmit the last digit of the number; it is assumed therefore, in the design herein described, that when the counter-triggers 1 to 6(25) reach the same position as counter-triggers 1 to 6(12) all the stored numerical digits have been transmitted.

Figure 24:
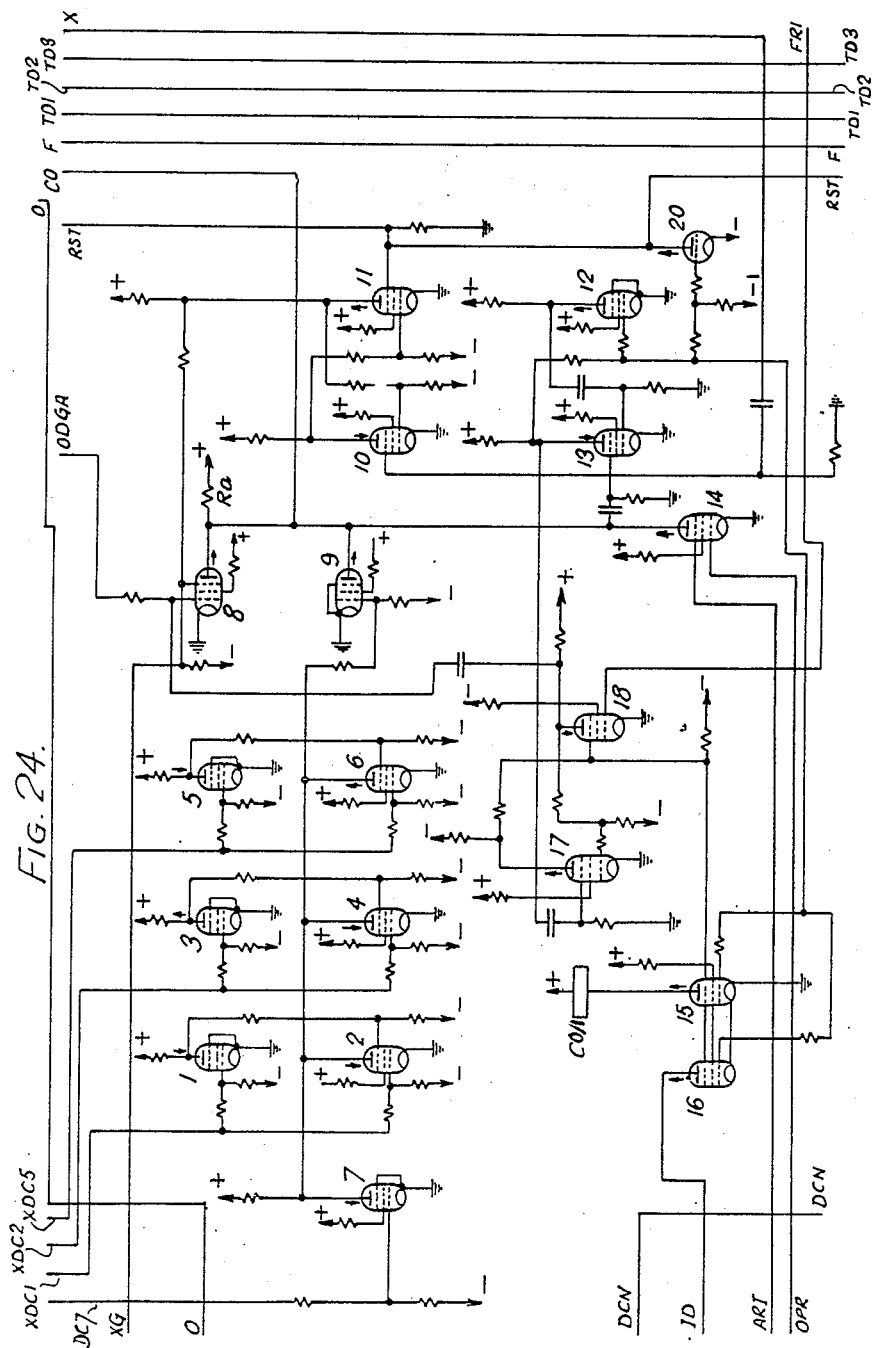

The position of the counter-triggers in Fig. 12 is indicated by the distribution of potentials on the anodes of the tubes 1(12), 3(12) and 5(12). Similarly the position of the counter-triggers in Fig. 25 is shown by the distribution of potentials on the anodes of tubes 1(25), 3(25) and 5(25). In Fig. 24 the valves 1(24) to 6(24) are so interconnected and coupled to the anodes of the counter-trigger tubes 1(12), 3(12), and 5(12) and of the counter-trigger tubes 1(25), 3(25) and 5(25) that when the counters are in the same position tubes 2(24), 4(24) and 6(24) are switched off, and when the counter-triggers are in different positions one or more of said tubes is switched on. The circuit of valves 1(24) to 6(24) is similar in all respects to that of tubes 12(22) to 17(22) and is described elsewhere. The anodes of tubes 2(24), 4(24) and 6(24) are connected together and via a suitable resistance to + potential. To the anodes of said tubes is also connected the anode of tube 7(24). The cathodes of tubes 1(24) to 7(24) are earthed. The control grid of tube 7(24) is D. C. coupled to the anode of valve 7(12), the up tube of the counter-trigger 7 and 8(12). The said counter-trigger is operated when the counter tubes 1(12) to 6(12) step to position 9 and remians operated until the register releases. Thus although when tubes 2(24), 4(24) and 6(24) are switched off by coincidence in the position of the counter-triggers 1 to 6(12) and 1 to 6(25) the potential on the anodes of tube 2(24), 4(24) and 6(24) cannot rise to near + potential until the counter 1 to 6(12) is in the ninth or more position. It will be appreciated then that when all the stored numerical digits have been transmitted the potential on the anodes of tubes 2(24), 4(24), 6(24) and 7(24) will rise to near + potential. A D. C. coupling between the said anodes and the control grid of tube 9(24), the cathode of which is earthed, switches on tube 9(24) and, since the anode of valve 9(24) is connected to the anode of tube 8(24), operates pulse-trigger 13 and 12(24) and brings about the release of the register as described previously for the case of local call.

AFTER SERVICE CALLS

It should be noticed in the case of all three classes of call, namely local, trunk and service calls, that after the transmission of the last digit of the translation which may be called the Nth, the counter-triggers 3 to 8(22) will be stepped, so that when lead F2 is reduced to earth potential, it may be said that the transmitter seeks the N+1th digit of the translation. Since there is no such digit on the disc and since previously the trigger 8 and 9(26) has been operated by the hole in track 22, the digit signalled to the transmitter is the first numerical digit stored on store No. 4. In the case of service calls, after the transmission of the last digit of the translation, the transmitter seeks a further digit as described above and reference to Fig. 3 and explanatory Table 3 shows that a radial strip has been allocated to such a further digit. When lead F2 is reduced to near earth potential, therefore, the valves 3(23) to 9(23) will be permitted to respond to any holes being scanned by the associated photocells. Tracks 12 to 20 are devoid of holes since there is no further digit to be transmitted, but a hole is provided in track 23. Consequently tube 3(23) is momentarily switched on. The anode of tube 3(23) is connected via lead CO to the anode of tube 8(24) and the cathode to earth. Therefore when tube 3(23) switches on the trigger 12 and 13(24) operates and the register transmitter releases as previously described.

TRANSMISSION SUSPENDING MEANS (FIG. 27)

On certain classes of calls such as for example calls to a manual exchange equipped with the coded call indicator system it is necessary that the register transmitter be capable of suspending further transmission of digits on receipt of a signal from the said manual exchange, and of continuing the transmission of said digits when signalled to do so by the said manual exchange. The signal to suspend transmission commonly takes the form of a reversal of the potentials on the + and − wires at the said manual exchange, and the signal to continue transmission of a restoration of said potentials. Provision is therefore made in the design here described for the register transmitter to obey such signals and the method adopted will now be described.

Referring to Fig. 27 the leads + and − are connected together via the break contacts PV1 and the make-before-break change-over contacts IP1 and IP2. Between the leads + and − are also connected in series a resistance and condenser which constitute the customary spark quench circuit. When the contacts IP1 and IP2 are operated, a resistance, R271, of approximately 100 ohms is switched in series with the leads + and −. That end of the said resistance which is connected to the + lead is also connected via a grid current limiting resistance to the control grid of tube 11(27). The other end of the said resistance which is connected to the − lead is connected to the control grid of tube 15(27). The cathodes of tubes 11(27) and 15(27) are connected together and via resistance R272 to the −potential. The anode of tube 15(27) is connected directly to the + potential and the anode of tube 11(27) to the + potential via R273. The potential on the + lead will always be negative with respect to earth potential although the potential difference between the + lead and earth will depend on the resistance of the connection beyond the leads + and − and on the type of equipment comprising said connection. The potential on the + lead will however never be as negative with respect to earth as is the source of − potential to which is connected the resistance R272. The current flowing in the leads + and − is sufficient to produce a potential drop across the resistance R271 equal to or exceeding the control grid bias of the tube 11. It will be seen then that when the contacts IP1 and IP2 are operated the cathodes of tubes 11(27) and 15(27) will assume a potential substantially equal to that of the − lead. When there is no reversal of the leads + and − in operation, the tube 11(27) will be switched on and the potential on the anode thereof will assume a potential approaching that of the − lead. When however a reversal of the leads + and − has taken place and the contacts IP1 and IP2 are operated, tube 11(27) will be switched off and the potential on the anode thereof will assume a potential near + potential.

The anode of tube 11(27) is D. C. coupled to the control grid of tube 12(27), the cathode of which is earthed and the anode of which is connected via a coil of relay IP/4 to + potential. The other coil of relay IP/4 is connected between + potential and the anode of tube 14(27), the cathode of which is earthed and the control grid of which is connected via a grid current limiting resistance to the lead DCN. The suppressor grid of tube 14(27) is D. C. coupled to the anode of tube 11(26). A late break contact IP3 of relay IP connects the anode of tube 11(27) via a suitable resistance R274 to the source of − potential, the magnitude of resistance R274 being so chosen with respect to resistance R273 that the anode of tube 11(27) is at approximately earth potential when relay IP is released.

Mention was made above of the resistance network connected to lead DCN in Fig. 22. The lead DCN is connected via a resistance to the − potential and via a second resistance to the anode of tube 4(22), via a third resistance to the anode of tube 6(22) and via a fourth to that of tube 8(22). The said tubes 4(22), 6(22) and 8(22) are switched on when the counter triggers of which they form a part are released. The magnitudes of the said resistances are so chosen that when one, or more, of the tubes 4(22), 6(22) and 8(22) is switched off, the potential on the lead DCN is raised sufficiently to switch on tube 14(27) at the control grid, but when all the tubes 4(22), 6(22) and 8(22) are switched on, said tube is switched off thereat.

Prior to transmission of the first translation digit of a call, the counter triggers 3 to 8(22) are in a released condition and tube 14(27) is switched off at the control grid. When the last impulse of the first translation digit has been transmitted the pulse trigger 11 and 12(26) is operated and by virtue of the connecting lead DCD stops the counter-triggers 3 to 8(22) one place, thereby switching on tube 14(27) at the control grid. Simultaneously the operation of pulse-trigger 11 and 12(26) switches on tube 14(27) at the suppressor grid. Tube 14(27) is therefore switched on and so operates relay IP/4. The operation of said relay inserts the resistance R271 Fig. 27 in the + and − loop circuit by closing contacts IP1 and IP2; disconnects the resistance R274 from the anode of tube 11(27) at contacts IP3, which contacts are adjusted to break after the make-before-break contacts IP1 and IP2 have made, and at contacts IP4 Fig. 26 connects the control grid of tube 3(26) to the — potential via a current limiting resistance of such a value compared with the resistance R266 that when relay IP/4 is operated tube 3(26) is held switched off at the control grid.

If during the inter-train period following the transmission of the first translation digit no reversal of the potentials on the leads + and — takes place, tube 11(27) will remain switched on and tube 12(27) therefore switched off, and at the end of the inter-train period the release of pulse-trigger 11 and 12(26) will switch off tube 14(27) at the suppressor. Relay IP/4 will then release and the transmission of the second translation digit, or, if none, the first numerical digit, will commence. If, however, during the said inter-train period a reversal of the potentials on the leads + and — takes place, tube 11(27) will be switched off and tube 12(27) therefore switched on. When, at the end of the inter-train period, the pulse-trigger 11 and 12(26) releases and so switches off tube 14(27) relay IP/4 remains operated by the current in the coil to which is connected the anode of tube 12(27). Transmission of the next digit is therefore prevented by the contacts IP4, until such time as the reversal of the potentials on leads + and — is removed. When this occurs, tube 11(27) switches on, valve 12(27) switches off, relay IPr releases, and the transmission of the next digit commences.

FORCED RELEASE (FIG. 8)

At any time during the progress of a call, the calling subscriber may release the connection by hanging up his receiver. Abandoning the call in this manner results in the disconnection of the earth on lead PU Fig. 7 at contacts L, and tube 1(9) is therefore switched off and later pulse-trigger 6 and 7(8) is thereby operated. A D. C. coupling between the anode of tube 1(9) and the suppressor grid of tube 7(8) via lead Ar, is such that when valve 1(9) is on, tube 7(8) is switched off and when valve 1(9) is off, tube 7(8) is switched on at the suppressor. The control grid of tube 7(8) is pulse coupled via lead F1 to the anode of tube 6(9). When therefore pulse trigger 6 and 7(9) operates after the disconnection of the earth on lead PU, the tube 7(8) momentarily switches on and tube 8(8) switches off by virtue of the D. C. coupling between the anode of tube 7(8) and the control grid of tube 8(8). The next development depends on whether there is a reversal of the potentials on leads + and — in force, for when tube 8(8) switches off, the suppressor grids of both tubes 9(8) and 14(24) are raised in potential sufficiently to switch on said tubes at the suppressor grids by virtue of the D. C. coupling between the anode of tube 8(8) and the said suppressor grids. If a reversal of the potential on leads + and — is in force tube 9(8) switches on and forced release of the register transmitter is effected as described later. If no reversal is in force, tube 12(27) will be off and such is the D. C. coupling between the anode of tube 12(27) and the control grid of tube 14(24), via lead OPR, that when tube 12(27) is on, tube 14(24) is switched off at the control grid and when tube 12(27) is switched off, tube 14(24) is switched on thereat. Consequently when tube 8(8) switches off, tube 14(24) switches on, and via the pulse coupling between the anode of tube 14(24) and the suppressor grid of tube 13(24) operates pulse-trigger 13 and 12(24). Thereafter release of the register transmitter is as described above.

As the register-transmitter is only required during the setting up time of a call a small number of registers can be made to serve a large number of calls and in order to obtain economy in the provision of equipment it is desirable that a register-transmitter should not be engaged unnecessarily by a calling subscriber who dials a non-existent code, that is a code for which no translation is recorded on the rotating disc, or by a calling subscriber who after being connected to a register-transmitter takes an unnecessarily long time dialling the wanted subscriber's number. It is customary in telephone exchanges of the type in which apparatus here described may be installed, to provide time pulses from a master clock circuit at 30 sec. intervals, and it is here assumed that such pulses are available and are of a positive character sufficient in magnitude to switch on momentarily the counter driving tube 17(8), to the control grid circuit of which said time pulses are pulse-coupled from load TP.

The register-transmitter is arranged to disconnect from a 1st code selector when the following conditions obtain. (a) If the register-transmitter receives no dialled impulses within 30 to 60 seconds after being connected to a 1st code selector. (b) If, on a local or service call, the register-transmitter has not completed its operations within 30 to 60 seconds after being connected to a 1st code selector. (c) If, on a trunk call the register-transmitter has not completed its operations in 60 to 90 seconds after being connected to a 1st code selector. The manner in which the register-transmitter disconnects from a 1st code selector under conditions (a), (b) and (c) is known in the art of telephone transmission as forced release.

Forced release, not controlled by the 30 second pulses, is used to disconnect the register-transmitter from a 1st code selector when a calling subscriber (d) dials a non-existent code and (e) when a calling subscriber hangs up his receiver while the transmitter is being restrained by the presence of a reversal of the potentials on the leads + and —.

For the description of forced release under the conditions (a) and (b) just described reference will now be made to Fig. 8. Tubes 15(8) to 12(8) comprise two counter triggers driven by tubes 17(8) and 16(8). The suppressor grids of tubes 14(8) and 12(8) are D. C. coupled to the anode of tube 2(8) such that when the register-transmitter is in a released condition and tube 2(8) is therefore on, the suppressor grids of tubes 14(8) and 12(8) are at a sufficiently negative potential to switch off said tubes. The two counter triggers are then said to be released. When a register-transmitter becomes connected to a 1st code selector tube 1(8) switches on, valve 2(8) switches off and the suppressor grids of tubes 14(8) and 12(8) are raised to the potential of the cathodes of said tubes, namely that of earth. The next pulse on the lead TP will operate the counter trigger 15 and 14(8). 30 seconds later a second pulse on lead TP will release said counter trigger and a positive pulse from the anode of tube 14(8) is communicated via a pulse coupling to the control grid of tube 10(8). To the control grid of tube 10(8) are connected two resistances one of which is connected to earth potential and the other to the — potential the magnitude of said resistances being such that the control grid is maintained sufficiently negative with respect to the cathode, which is connected to earth, to switch off tube 10(8). The above mentioned positive going pulse from the anode of tube 14(8) is sufficient to switch on tube 10(8) momentarily, and so reduce the potential on the anode of tube 3(27), by virtue of the connecting lead FRT, that the pulse trigger 3 and 4(27) is operated thereby.

The operation of pulse trigger 3 and 4(27) switches on tube 9(27) by means of the D. C. coupling between the anode of tube 4(27) and the control grid of valve 9(27). The cathode of tube 9(27) is earthed and the anode is connected by lead OD to the anode of tube 3(26). Relay PV/1 is therefore operated, opening the circuit between leads + and —, for a period dependent mainly on the values of condenser C275 and the resistance R275 in Fig. 27, said period being chosen to be sufficiently long to enable all apparatus which is being held by the loop circuit between leads + and — to release before relay PV/1 releases. When pulse trigger 3 and 4(27) releases, pulse trigger 1 and 2(27) operates by reason of the pulse connection between the anode of tube 4(27) and the suppressor grid of tube 2(27). Tube 10(27) has the anode connected to + potential and the cathode connected, via lead FR, the hunter contacts H3, relay contacts KR2 and a coil of relay M/1 in 1st code selector, to earth potential. The control grid of tube 10(27) is D. C. coupled to the anode of tube 2(27) such that when pulse trigger 1 and 3(27) operates, tube 10(27) switches on and when pulse trigger 2 and 3(27) releases, tube 10(27) switches off. When tube 10(27) switches on, relay M/1 operates until the pulse trigger 1 and 2(27) releases. The period of operation of pulse trigger 1 and 2(27) depends largely on the values of condenser C276 and resistance R276 and is sufficiently long to enable relay M/1 to release relay KR/4 and so disconnect the register transmitter at contacts ER1, ER2, ER3, ER4.

When the PU lead is disconnected at the contacts ER1, the release of the register transmitter circuits continues as described above for the case of a calling subscriber abandoning the call.

In the case of a calling subscriber dialling a trunk call under condition (C) above excessive holding time of the register transmitter is guarded against as follows: The register transmitter will automatically disconnect by forced release as described for cases (a) and (b) if the last digit of the translation of the trunk code has not signalled to the transmitter in 30–60 seconds after being connected to a 1st code selector. If, however, the translation has been signalled in that time, the negative pulse on lead X, which accompanies the signalling of the last digit of the translation over leads NT1–4, will have operated trigger 10 and 11(24), and so switched off tube 8(24) at the suppressor grid. Lead XG connects the suppressor grids of tubes 8(24) and 10(8). Consequently, when the last digit of the translation of the trunk code is signalled over leads NT1–4, tube 10(8) is switched off at the suppressor grid and when the control grid of said tube is momentarily switched on at 30–60 seconds, the said tube remains off and so prevents forced release. The positive going pulse from the anode of tube 14(8) which momentarily switches on tube 10(8) at the control grid as mentioned above, also momentarily switches on counter driving tube 16(8), and so operates counter trigger 13 and 12(8). 30 seconds later a third pulse on lead TP, Fig. 8, effects the release of said counter trigger thereby momentarily switching on tube 11(8) by means of the pulse coupling between the anode of tube 12(8) and the control grid of tube 11(8). The cathode of valve 11(8) is connected to earth and the control grid to a biassing arrangement similar to that described for tube 10(8) above. The anode of tube 11(8) is connected to the anode of valve 10(8), and so when tube 11(8) is momentarily switched on 60–90 seconds after the register-transmitter is connected to the 1st code selector, pulse trigger 3 and 4(27) operates and forced release is obtained as described above.

In the event of a calling subscriber dialling a non-existent or spare code, no translation digit will be signalled over leads NT1–4 and the counter triggers 3 to 8(22) will remain in a released condition, and tube 14(27) will remain switched off at the control grid. Since the control grid of tube 14(27) is connected to the control grid of tube 13(27) this tube will also remain switched off. The anode of tube 13(27) is D. C. coupled to the control grid of tube 5(27) so that when tube 13(27) is on tube 5(27) is switched off at the control grid and when tube 13(27) is off, tube 5(27) is switched on. When the third code digit has been dialled in, the counter triggers 1 to 8(12) step from position three to position four, thereby raising the potential of the control grid of tube 16(12) and of lead IDG4 to substantially earth potential. Lead IDG4 is connected to the control grid of tube 8(27) the cathode of which is earthed. Tube 8(27) is therefore switched on and operates the pulse trigger 6 and 7(27) by means of the D. C. coupling between the anode of tube 8(27) and the suppressor grid of tube 7(27). Pulse trigger 6 and 7(27) is adjusted to remain operated for a period sufficient to ensure that no translation digit has been transmitted, a period of about 2 seconds. Said pulse trigger then releases and switches tube 5(27) by virtue of the pulse coupling between the anode of tube 6(27) and the suppressor grid of tube 5(27). Since the anode of tube 5(27) is connected to the anode of tube 3(27), pulse trigger 3 and 4(27) operates and forced release is obtained as described above.

Reference has been made above to the change necessary in the form of release taken by the register-transmitter if the calling subscriber abandons the call at a time when a reversal of the potentials on the leads + and — is in force; condition (e) above. As is well known in the telephone art, if the register-transmitter were released as described above, whilst the said reversal of potentials on leads + and — existed, the calling subscriber's meter would be credited with a call. To avoid this it is customary to obtain release of the register-transmitter in these circumstances by the forced release method thereby releasing all equipment held by the loop circuit between the leads + and — before operating relay M/1 and so initiating the release of the 1st code selector and the register-transmitter. The presence of a reversal of potentials on leads + — holds tube 11(27) off and valve 12(27) on. When valve 12(27) is on tube 14(24) is switched off at the control grid, and tube 9(8) is switched on at the control grid by virtue of the D. C. coupling between the anode of tube 11(27) and the control grid of tube 9(8) via lead AFR. When, therefore, the tube 8(8) switches off and thereby raises the potential on the suppressor grids of tubes 14(24) and 9(8), tube 9(8) switches on and 14(24) remains off. Since the anode of tube 9(8) is connected by a lead FRT to the anode of tube 3(27), the pulse trigger 3 and 4(27) is thus operated and forced release is effected as described above.

Owing to the method of testing for a free register transmitter employed in the first code selector circuit it is possible for relay K/2, Fig. 7, to operate and hold to the potential on the P lead of the registered transmitter without the subsequent operation of contacts KR1–4 taking place. Alternatively the calling subscriber may abandon the call after relay K/2 has operated but before relay KR/4 has connected the contact of relay L to the PU lead. In order to release the register transmitter in these circumstances it is arranged that if the PU lead is not connected to earth within a predetermined time of the P lead being connected to earth, the register transmitter disconnects from the first code selector. Thus when a free register transmitter is seized by a 1st code selector the P lead is raised to substantially earth potential and so switches on valve 1(8). The anode of tube 1(8) is D. C. coupled to the control grid of tube 2(8) so that when valve 1(8) is off, tube 2(8) is on and vice versa. A condenser of suitable value is connected between the control grid of tube 2(8) and earth, thereby rendering valve 2(8) insensitive to switching surges occurring on the P lead. The anode of tube 2(8) is pulse coupled to the control grid of tube 3(8). To the control grid of 3(8) is connected, via a resistance, a source of potential sufficiently negative to maintain said tube switched off. When tube 1(8) is switched on, tube 2(8) switches off and tube 3(8) momentarily switches on. Since the anode of tube 3(8) is connected to the anode of tube 4(8) the up tube of the pulse trigger to 4 and 5(8), said pulse trigger operates. To the control grid of tube 6(8) is connected via a resistance a source of potential sufficiently negative to maintain a tube 6(8) switched off. In addition, the control grid of tube 6(8) is pulse coupled to the anode of valve 4(8) so that when the pulse trigger 4 and 5(8) releases, tube 6(8) is momentarily switched on at the control grid. The suppressor grid of tube 6(8) is D. C. coupled, over lead AR, to the anode of tube 1(9), so that when relay KR/4 operates and connects earth potential to the PU lead, tube 1(9) switches on and so switches off tube 6(8) at the suppressor grid. If, however, the earth potential is not applied to the control grid of tube 1(9) during the time the pulse trigger 4 and 5(8) remains operated, tube 1(9) remains off and valve 6(8) thereby remains switched on at the suppressor grid, and when pulse trigger 4 and 5(8) releases, tube 6(8) switches on momentarily. The anode of tube 6(8) is D. C. coupled to the control grid of tube 8(8) so that tube 8(8) is momentarily switched off. The anode of tube 8(8) is D. C. coupled to the suppressor grid of tube 14(24), via lead AR1, so that when tube 8(8) is momentarily switched off, tube 14(24) is momentarily switched on, thereby operating the pulse trigger 13 and 12(25) and so releasing the register transmitter as described above.

FIRST CODE DIGIT "ONE" RESET

In the automatic telephone system in which the register transmitter is designed to function it is arranged that no dialled code commences with the digit 1. Furthermore it is customary to arrange that if the digit 1, or any accidental impulse simulating this digit, is received as a first dialled digit then that digit must be absorbed and the register transmitter prepared so that the next digit received, if other than the digit 1, will be stored on store No. 1. It will be seen from the foregoing description that the receipt of digit 1 as a 1st digit will result in said digit being stored in store No. 1, whereupon of the tubes 2(11), 4(11), 6(11) and 8(11), all of which are on when store No. 1 is released, valve 2(11) will switch off. The anode of 2(11) is D. C. coupled to the suppressor grid of tube 9(11) and when valve 2(11) is on, valve 9(11) is switched off at the suppressor grid and when tube 2(11) is off, tube 9(11) is switched on. The control grid of tube 9(11) is connected to the control grid circuit of tube 14(12) so that only when the counter triggers 1 to 8(12) are in the second position, to which said triggers are driven after receipt of first dialled digit, is the tube 9(11) switched on at the control grid. When therefore digit 1 is received as a first dialled digit tube 9(11) switches on.

Lead FR1, Fig. 11, is connected to − potential via resistance and by other resistances to the anodes of tubes 9(11), 4(11), 6(11) and 8(11). The values of the said resistances are chosen so that when all said tubes are on, the potential on lead FR1 is such as to switch off tube 18(24), to the control grid of which it is connected and when any one of said tubes is off, the potential on lead FR1 is such as to switch on tubes 18(24). Thus it is apparent that when digit 1 is received as a first digit, tube 18(24) is switched off.

Referring now to Fig. 24, tube 18(24) is the on tube of the trigger 17 and 18(24), of which trigger the anode of tube 17(24) is D. C. coupled to the suppressor grids of tubes 15(24) and 16(24) so that when said trigger is released tubes 15 and 16(24) are switched on at the suppressor grids and when said trigger is operated tubes 15(24) and 16(24) are switched off at the suppressor grids. The anode of tube 18(24) is pulse coupled to the control grid of tube 8(24). When therefore, tube 18(24) is switched off at the control grid, the trigger 17 and 18(24) operates and switches off tubes 15 and 16(24) at the suppressor grids; in addition, the positive pulse at the anode of tube 18(24) is communicated to the control grid of tube 8(24) thereby momentarily switching said tube on. The pulse trigger 13 and 12(24) is thus operated and as described above all operated triggers in the register transmitter releasable by a negative pulse on lead RST are released. Since however, tube 15(24) is switched off at the suppressor grids, relay CO/1 is not operated and the register transmitter remains connected to the 1st code selector. When pulse trigger 13 and 12(24) releases, the trigger 17 and 18(24) is released by virtue of the negative pulse communicated from the anode of tube 13(24) to the suppressor grid of valve 17(24), over the pulse coupling provided.

I claim:
1. Automatic telephone exchange apparatus comprising, in combination, a register translator including register-transmitter means, record means having recorded therein a plurality of sets of coded call routing and control data, and record reader means continuously scanning said record means and responsive sequentially to the sets of recorded data thereon and producing sequentially outputs of electrical signals corresponding respectively to the sets of recorded data; said register-transmitter comprising means for registering electrical input signals including coded call routing data for a call to be advanced through the apparatus, means for electrically comparing call routing data of the so registered signals with the sequential outputs of call routing data of said record reader means, and transmitter means, responsive to correspondence of the call routing data of a so read set of recorded data with the registered call routing data, and transmitting signals controlled at least in part by the reader outputs from the control data recorded in the so corresponding set.

2. A combination according to claim 1 comprising a plurality of said register-transmitters served in common by the output of said record reader means, said several register-transmitters thus being enabled simultaneously to compare call routing data registered therein with the reader's sequential output of recorded call routing data and to be controlled, respectively, by the control data of the corresponding sets of recorded data.

3. A combination according to claim 2, in which each of said register-transmitters further includes means rendering said register-transmitter receptive of electrical signals from said reader only when input signals are registered in its input signal registering means.

4. A combination according to claim 1, in which said register-transmitter further includes means rendering said register-transmitter receptive of electrical signals from said reader only when input signals are registered in its input signal registering means.

5. A combination according to claim 1, said electrical input signals comprising, in part, dialing impulse signals to be advanced through the apparatus, and said register transmitter including means for storing such impulse signals and means for subsequently delivering them to said transmitter for transmission thereby.

6. Apparatus according to claim 5 in which said record means comprises a record in which items of information are represented by rows of apertures, the disposition of the apertures in a given row depending upon the information recorded.

7. Apparatus according to claim 5 in which said record means comprises a disc record in which said items of information are recorded as radial rows of apertures in said disc, each radial row of apertures representing the information corresponding to an operation to be performed.

8. Apparatus according to claim 5 in which said record means comprises a disc record in which said stored items of information are recorded as radial rows of apertures in said disc, each radial row of apertures representing information identified with coded call routing digits.

9. Automatic telephone exchange apparatus comprising, in combination, a register translator including a register transmitter means, record means having recorded therein a plurality of sets of identifying data and equivalent code data, and record reader means continuously scanning said record means and sequentially producing electrical outputs corresponding to the sets of recorded data; said register transmitter comprising means for deriving from input signals, and storing, and deriving electrical outputs of, identifying data ordinarily corresponding to the electrical outputs produced by said reader means from the identifying data of some particular one of said sets of identifying data, and means operable when the reader derived identifying data outputs correspond to the register derived outputs for transmitting signals corresponding to code data of said particular set.

10. Automatic telephone exchange apparatus according to claim 9, in which the record means has the sets of identifying data recorded therein in detectable binary code, with the equivalent code data likewise recorded therein in binary code.

11. Automatic telephone exchange apparatus according to claim 10, in which the record means has, in at least some instances, a plurality of items of equivalent code data to be sequentially transmitted for a certain set of identifying data, characterized in that the identifying data is repeated for each item of equivalent code data, together with control items identifying the sequence in which the code data items are to be transmitted, in which the record reader comprises means for producing electrical sequencing signals corresponding to said control items, and in which the register-transmitter comprises selecting means controlled in part by said sequencing signals for establishing the order of transmission of the reader produced code data signals of the set being transmitted.

12. A register translator for routing dial system telephone calls comprising in combination, a recording means containing a number of individual records sequentially arranged; each individual record containing a binary recording of called exchange code digits a binary recording of a series of translation digits and a recording of control digits designating the order in which the translation digits are arranged in the translation; reading means continuously scanning said individual records and simultaneously producing, as each record is scanned, electrical outputs representative of the binary recordings of the called exchange code digits thereof, said reading means further producing electrical outputs representative of the several translation digits and of the several order designating digits thereof while producing the electrical outputs representative of the called exchange code digits; a register-transmitter comprising means for receiving dial system signals constituting called exchange code digits, a series of binary counters, and means for registering the so received exchange code digits in said binary counters; said register transmitter comprising means for transmitting translation digit signals under control of the reader outputs thereof and for counting the translation digits transmitted, and said register transmitter comprising means for blocking passage to said transmitter of said reader outputs of translation digits except when identity exists between the called exchange code digits registered in said register transmitter and the called exchange code digits being scanned by said reader, said last named means when such identity exists, unblocking passage of said translation digit signals from said reader to said transmitter one by one in the order established by said recorded order designating digits under control of said transmitted digit counter.

References Cited in the file of this patent

UNITED STATES PATENTS

| Number | Name | Date |
|---|---|---|
| 2,361,859 | Mallina | Oct. 31, 1944 |
| 2,364,446 | Hubbard | Dec. 5, 1944 |
| 2,387,018 | Hartley | Oct. 16, 1945 |
| 2,428,024 | Herbig | Sept. 30, 1947 |
| 2,519,688 | Mitchell | Aug. 22, 1950 |
| 2,558,577 | Myers | June 26, 1951 |